United States Patent
Imafuku

(10) Patent No.: US 10,145,472 B2
(45) Date of Patent: Dec. 4, 2018

(54) TRANSFER FOR VEHICLE

(71) Applicant: TOYOTA JIDOSHA KABUSHIKI KAISHA, Toyota-shi, Aichi (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/348,518

(22) Filed: Nov. 10, 2016

(65) Prior Publication Data

US 2017/0152947 A1 Jun. 1, 2017

(30) Foreign Application Priority Data

Nov. 26, 2015 (JP) ................................. 2015-231100

(51) Int. Cl.
*B60K 17/02* (2006.01)
*F16H 63/28* (2006.01)
(Continued)

(52) U.S. Cl.
CPC ............. *F16H 63/28* (2013.01); *B60K 17/02* (2013.01); *B60K 17/34* (2013.01); *B60K 17/344* (2013.01); *B60K 17/351* (2013.01); *F16D 13/52* (2013.01); *F16D 28/00* (2013.01); *F16H 25/2204* (2013.01); *F16H 63/30* (2013.01); *F16H 63/34* (2013.01); *B60K 2023/0816* (2013.01);
(Continued)

(58) Field of Classification Search
CPC ...... F16H 63/28; F16H 25/2204; F16H 63/30; B60K 17/02; B60K 17/34; B60K 17/344; B60K 17/351; B60K 17/354; F16D 13/52; F16D 28/00
See application file for complete search history.

(56) References Cited

U.S. PATENT DOCUMENTS 6,022,289 A 2/2000 Francis
9,989,151 B2 * 6/2018 Imafuku ................ B60K 17/08
(Continued)

FOREIGN PATENT DOCUMENTS

DE 699 18 931 T2 7/2005
DE 11 2012 005 835 T5 10/2014
(Continued)

*Primary Examiner* — Kevin Hurley
*Assistant Examiner* — Marlon A Arce
(74) *Attorney, Agent, or Firm* — Oliff PLC

(57) ABSTRACT

A transfer includes: an input shaft; an output shaft; a high-low switching mechanism; an output member whose output destination is different from output destination of the output shaft; a clutch for transmitting a power to the output member; a first transmitting mechanism for transmitting movement of an internally threaded member to the clutch; and a drum cam having a cam groove. The cam groove includes a first inclined section that causes the high-low switching mechanism to be switched between a high-speed gear stage and a low-speed gear stage, and a second inclined section that causes the first transmitting mechanism to be switched between (i) a separated position in which the first transmitting mechanism is separated from the clutch and (ii) a contact position in which the first transmitting mechanism is in contact with the clutch, while the high-speed gear stage is established in the high-low switching mechanism.

11 Claims, 9 Drawing Sheets

(51) Int. Cl.
*B60K 17/344* (2006.01)
*F16D 13/52* (2006.01)
*F16D 28/00* (2006.01)
*F16H 25/22* (2006.01)
*F16H 63/34* (2006.01)
*F16H 63/30* (2006.01)
*B60K 17/34* (2006.01)
*B60K 17/35* (2006.01)
*F16D 23/00* (2006.01)
*F16H 3/54* (2006.01)
*F16H 37/06* (2006.01)
*F16H 25/20* (2006.01)
*F16H 63/18* (2006.01)
*F16D 23/12* (2006.01)
*B60K 23/08* (2006.01)

(52) U.S. Cl.
CPC ...... *B60K 2023/0858* (2013.01); *F16D 23/00* (2013.01); *F16D 2023/123* (2013.01); *F16H 3/54* (2013.01); *F16H 37/065* (2013.01); *F16H 63/18* (2013.01); *F16H 2025/2062* (2013.01); *F16H 2063/3063* (2013.01); *F16H 2063/3066* (2013.01); *F16H 2063/3079* (2013.01); *F16H 2200/0017* (2013.01); *F16H 2200/0034* (2013.01); *F16H 2200/2005* (2013.01)

(56) References Cited

U.S. PATENT DOCUMENTS

| | | | |
|---|---|---|---|
| 9,994,103 B2* | 6/2018 | Takaira | B60K 17/02 |
| 2004/0214688 A1 | 10/2004 | Takasaki et al. | |
| 2007/0251345 A1 | 11/2007 | Kriebernegg et al. | |
| 2015/0126318 A1 | 5/2015 | Larkin et al. | |
| 2016/0096429 A1* | 4/2016 | Imafuku | B60K 17/344 |
| | | | 180/233 |
| 2017/0130838 A1 | 5/2017 | Imafuku et al. | |
| 2017/0158052 A1 | 6/2017 | Hamilton et al. | |

FOREIGN PATENT DOCUMENTS

| | | |
|---|---|---|
| DE | 10 2016 120 866 A1 | 5/2017 |
| DE | 10 2016 123 829 A1 | 6/2017 |
| JP | 2016-074342 A | 5/2016 |
| JP | 2017-065669 A | 4/2017 |

* cited by examiner

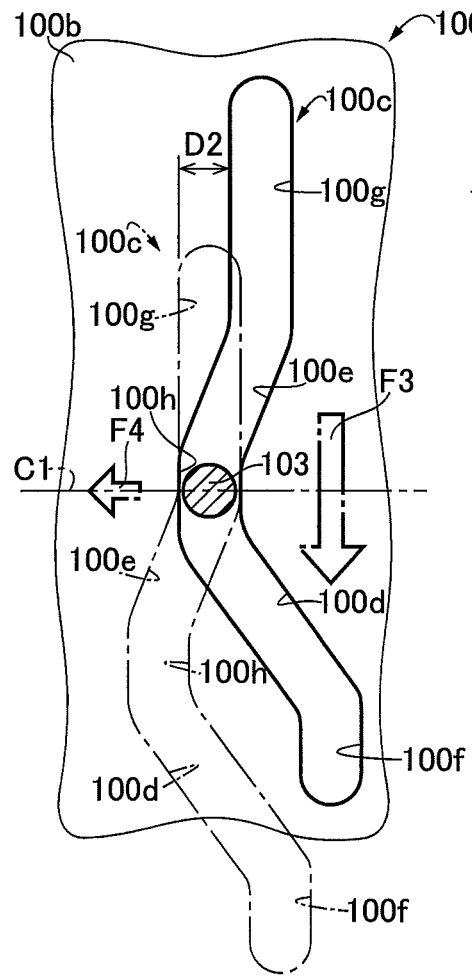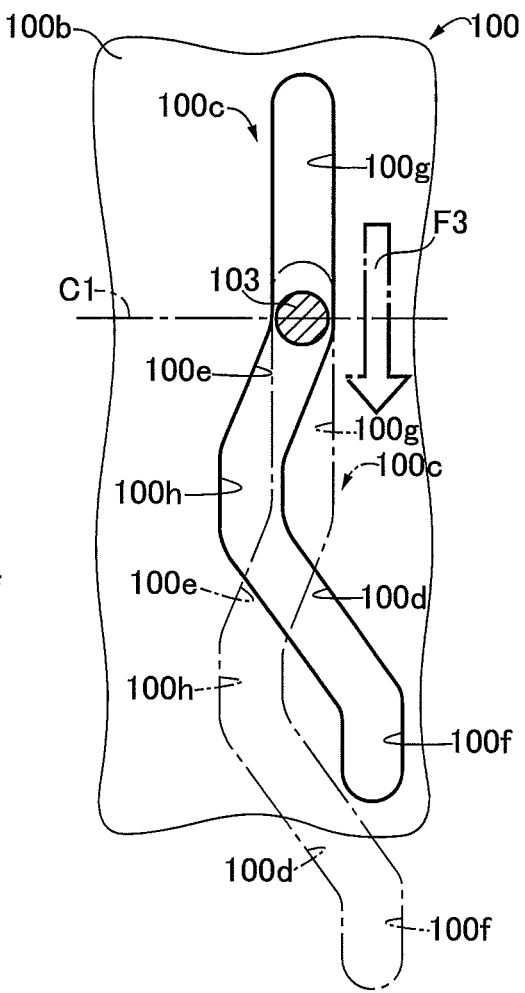
FIG.7A
FIG.7B

TRANSFER FOR VEHICLE

INCORPORATION BY REFERENCE

This application claims priority from Japanese Patent Application No. 2015-231100 filed on Nov. 26, 2015, the disclosure of which is herein incorporated by reference in its entirety.

BACKGROUND OF THE INVENTION

Field of the Invention

The present invention relates to a transfer for a vehicle, which includes a high-low switching mechanism configured to change a speed of rotation inputted to an input shaft and to transmit the rotation to an output shaft, and a clutch configured to adjust a part of a power transmitted to the output shaft and to transmit the adjusted part of the power to an output member. More particularly, the invention is concerned with techniques for enabling such a transfer to be made more compact than in the prior art.

Discussion of Related Art

There is known a transfer for a vehicle, which includes an input shaft, an output shaft, a high-low switching mechanism configured to change a speed of rotation inputted to the input shaft and to transmit the rotation to the output shaft, an output member whose output destination is different from that of the output shaft, and a clutch configured to adjust a part of a power transmitted to the output shaft and to transmit the adjusted part of the power to the output member. An example of such a transfer is disclosed in Patent Document 1. In the transfer for a four-wheel drive vehicle disclosed in the Patent Document 1, an operation for switching the high-low switching mechanism and an operation for adjusting a torque transmitted through the clutch are made by a single motor. In the disclosed transfer, a drum cam is employed as a conversion mechanism that converts a rotation of the motor into a linear motion for the switching operation of the high-low switching mechanism, and a combination of a ball cam and a lever is employed as another conversion mechanism that converts the rotation of the motor into a linear motion for the torque adjustment operation of the clutch.

PRIOR ART DOCUMENT

Patent Document

[Patent Document 1] US 2007/0251345 A

SUMMARY OF THE INVENTION

The above-described transfer, in which the combination of the ball cam and the lever is employed for controlling the torque transmitted through the clutch, requires an arrangement in which an eccentric cam is mounted on a fork shaft which is parallel to the output shaft (rather than being mounted on the output shaft) and which is to be rotated by the motor, and the drum cam employed for the switching operation of the high-low switching mechanism is also mounted on the fork shaft. However, in the transfer with the above-described arrangement, the lever disposed between the output shaft and the fork shaft is required to have a length larger than a predetermined value, for ensuring a required value of the torque transmitted through the clutch. Moreover, it is necessary to avoid interference of the drum cam mounted on the fork shaft with the high-low switching mechanism and the clutch mounted on the output shaft. Therefore, in the above-described transfer, the output shaft and the fork shaft have to be distant from each other by a relatively large distance, thereby problematically increasing the size of the transfer.

The present invention was made in view of the background discussed above. It is therefore an object of the present invention to provide a transfer having a construction that enables the distance between the output shaft and the fork shaft to be made smaller and accordingly the size of the transfer to be made smaller than in the prior art. This object of the invention may be achieved according to any one of first through sixth aspects of the invention which are described below.

The first aspect of this invention provides: a transfer for a vehicle. The transfer includes: an input shaft and an output shaft disposed on a common axis and coaxial with each other; a high-low switching mechanism configured to change a speed of rotation inputted to the input shaft, by selectively establishing a high-speed gear stage and a low-speed gear stage, and to transmit the rotation to the output shaft; an output member whose output destination is different from output destination of the output shaft; a clutch configured to adjust a part of a power transmitted to the output shaft, and to transmit the adjusted part of the power to the output member; an electric motor; a screw mechanism which is supported by the output shaft, and which includes an externally threaded member and an internally threaded member that are in thread engagement with each other, such that a rotatable threaded member that is one of the externally threaded member and the internally threaded member is rotatable by the electric motor, and such that the internally threaded member is moved along the common axis when the rotatable threaded member is rotated by the electric motor; a first transmitting mechanism configured to transmit movement of the internally threaded member to the clutch; a fork shaft disposed on a parallel axis that is parallel to the common axis and axially movable along the parallel axis; a drum cam which is connected to the rotatable threaded member, and which is rotatable about the common axis, the drum cam having a cam groove provided in an outer circumferential surface thereof; a second transmitting mechanism including a cam engaging member that is engaged in the cam groove of the drum cam, and configured to cause the fork shaft to be axially moved along the parallel axis through the cam engaging member when the drum cam is rotated about the common axis; a fork provided in the fork shaft and configured to transmit axial movement of the fork shaft along the parallel axis, to the high-low switching mechanism; and a locking member which is configured, when the fork shaft is positioned in a high-speed-gear-stage establishing position that causes the high-low switching mechanism to establish the high-speed gear stage, to be removably engaged in a recessed portion provided in the fork shaft for restricting the axial movement of the fork shaft from the high-speed-gear-stage establishing position along the parallel axis. The cam groove of the drum cam includes: a first inclined section configured, when the drum cam is rotated about the common axis with the cam engaging member being engaged within the first inclined section, to cause the fork shaft to be moved along the parallel axis whereby the high-low switching mechanism is switched between the high-speed gear stage and the low-speed gear stage by the axial movement of the fork shaft, which is transmitted to the high-low switching mechanism through the fork; and a second inclined section configured, when the drum cam is rotated about the common axis with the cam engaging member being engaged within the second inclined section, to cause the first transmitting mechanism to be switched between (i) a separated position in which the first transmitting mechanism is separated from the clutch and (ii) a contact position in which the first transmitting mechanism is in contact with the clutch, while the high-speed gear stage is established in the high-low switching mechanism, such that the screw mechanism is moved, by rotation of the electric motor, along the common axis, whereby the first transmitting mechanism is separated from or is brought into contact with the clutch while the folk shaft is in the high-speed-gear-stage establishing position.

According to the second aspect of the invention, in the transfer defined in the first aspect of the invention, the locking member is forced toward the fork shaft by a locking spring, such that the locking member is removed from the recessed portion of the fork shaft when the high-low switching mechanism is switched from the high-speed gear stage to the low-speed gear stage by the first inclined section of the cam groove, and such that the locking member is engaged in the recessed portion of the fork shaft when the first transmitting mechanism is switched from the separated position to the contact position by the second inclined section of the cam groove.

According to the third aspect of the invention, in the transfer defined in the first or second aspect of the invention, the output shaft is rotatably held, at one of axially opposite end portions thereof which is located on a side of the drum cam, by an output-shaft supporting bearing which is located radially inside the drum cam within an axial length of the drum cam.

According to the fourth aspect of the invention, in the transfer defined in any one of the first through third aspects of the invention, the drum cam as well as the rotatable threaded member is rotatable by the electric motor, wherein the first inclined section of the cam groove extends in a direction inclined with respect to a circumferential direction of the drum cam, and wherein the cam engaging member is moved along the parallel axis by a distance larger than a distance by which the internally threaded member is moved relative to the externally threaded member along the common axis, when the drum cam and the rotatable threaded member are rotated about the common axis by the electric motor, during engagement of the cam engaging member within the first inclined section of the cam groove.

According to the fifth aspect of the invention, in the transfer defined in any one of the first through fourth aspects of the invention, the internally threaded member is in thread engagement with the externally threaded member through a plurality of balls.

According to the sixth aspect of the invention, in the transfer defined in any one of the first through fifth aspects of the invention, the second transmitting mechanism includes a waiting mechanism that is configured to transmit movement of the cam engaging member along the common axis, to the fork shaft through a spring member.

In the transfer of each of the above-described first through sixth aspects of the invention, when the above-described rotatable threaded member is rotated by the electric motor, the internally threaded member is moved along the common axis whereby the movement of the internally threaded member is transmitted to the clutch through the first transmitting mechanism. Further, when the rotatable threaded member is rotated by the electric motor, the fork shaft is moved along the parallel axis through the cam engaging member of the second transmitting mechanism engaged in the first inclined section of the cam groove, in response to rotation of the drum cam (that is connected to the rotatable threaded member) about the common axis, and the movement of the fork shaft is transmitted to the high-low switching mechanism through the fork. Thus, the drum cam serving for operation of switching the high-low switching mechanism is provided in the rotatable threaded member, so that the fork shaft is not required to be provided with the drum cam unlike in the prior art, whereby the distance between the output shaft and the fork shaft can be made small and accordingly the transfer can be made compact in size. Further, the linear motion of the internally threaded member of the screw mechanism disposed on the output shaft is transmitted to the clutch through the first transmitting mechanism, so that a ball cam and a lever serving for adjusting a transmission torque of the clutch are not required, whereby the distance between the output shaft and the fork shaft can be made advantageously small and accordingly the transfer can be made compact in size. Moreover, since the first transmitting mechanism is switched between the separated position and the contact position by the second inclined section of the cam groove in response to rotation of the drum cam about the common axis, the switching response can be improved over an arrangement in which the first transmitting mechanism is switched between the separated position and the contact position by movement of the internally threaded member of the screw mechanism along the common axis.

In the transfer of the above-described second aspect of the invention, when the high-low switching mechanism is to be switched from the high-speed gear stage to the low-speed gear stage, the locking member is removed from the recessed portion of the fork shaft against the biasing force of the locking spring, whereby the fork shaft is allowed to be moved along the parallel axis and accordingly the high-speed gear stage is switched to the low-speed gear stage. When the first transmitting mechanism is to be switched from the separated position to the contact position, the locking member is held engaged in the recessed portion of the fork shaft thereby restricting movement of the fork shaft along the parallel axis, so that the separated position is switched to the contact position whereby first transmitting mechanism is brought into contact with the clutch while the high-speed gear stage is established.

In the transfer of the above-described third aspect of the invention, the output shaft is rotatably held, at one of axially opposite end portions thereof which is located on a side of the drum cam, by the output-shaft supporting bearing which is located radially inside the drum cam within an axial length of the drum cam. This arrangement makes it possible to advantageously reduce an axial length of the transfer as measured in parallel to the common axis.

In the transfer of the above-described fourth aspect of the invention, the cam engaging member is moved along the parallel axis by a distance larger than a distance by which the internally threaded member is moved relative to the externally threaded member along the common axis, when the drum cam and the rotatable threaded member are rotated about the common axis by the electric motor, during engagement of the cam engaging member within the first inclined section of the cam groove. Owing to this arrangement, the switching between the high-speed gear stage and the low-speed gear stage in the high-low switching mechanism can be made with a remarkably higher response than an arrangement in which the switching between the high-speed gear stage and the low-speed gear stage is made by movement of the internally threaded member along the common axis in the screw mechanism.

In the transfer of the above-described fifth aspect of the invention, the internally threaded member is in thread engagement with the externally threaded member through the plurality of balls. Owing to this arrangement, the internally threaded member and the externally threaded member are smoothly rotatable relative to each other, thereby making it possible to stably reduce an electric power required for operation of the electric motor.

In the transfer of the above-described sixth aspect of the invention, the second transmitting mechanism includes a waiting mechanism that is configured to transmit movement of the cam engaging member along the common axis, to the fork shaft through a spring member. Therefore, upon switching between the high-speed gear stage and the low-speed gear stage in the high-low switching mechanism, a shock caused in the switching can be absorbed by the spring member of the waiting mechanism.

BRIEF DESCRIPTION OF DRAWINGS

FIGS. 6A-6C are a set of cross sectional views taken along line A-A of FIG. 5, wherein FIG. 6A shows a position of a cam engaging member when a fork shaft is positioned in a high-speed-gear-stage establishing position, namely, when a drum cam is positioned in H2 rotational position, FIG. 6C shows the position of the cam engaging member when the fork shaft is positioned in a low-speed-gear-stage establishing position, namely, when the drum cam is positioned in L4 rotational position, and FIG. 6B shows the position of the cam engaging member when the fork shaft is being switched, for example, from the high-speed-gear-stage establishing position to the low-speed-gear-stage establishing position.

FIGS. 7A and 7B are a set of cross sectional views taken along line A-A of FIG. 5, wherein FIG. 7A shows the position of the cam engaging member when the drum cam is positioned in the H2 rotational position, and FIG. 7B shows the position of the cam engaging member when the drum cam is positioned in H4 rotational position.

DESCRIPTION OF THE PREFERRED EMBODIMENTS

Hereinafter, an embodiment of the invention will be described in detail with reference to the accompanying drawings. In the following description of the embodiment, the figures are simplified or deformed as needed and portions are not necessarily precisely depicted in terms of dimension ratio, shape, etc.

Figure 1:
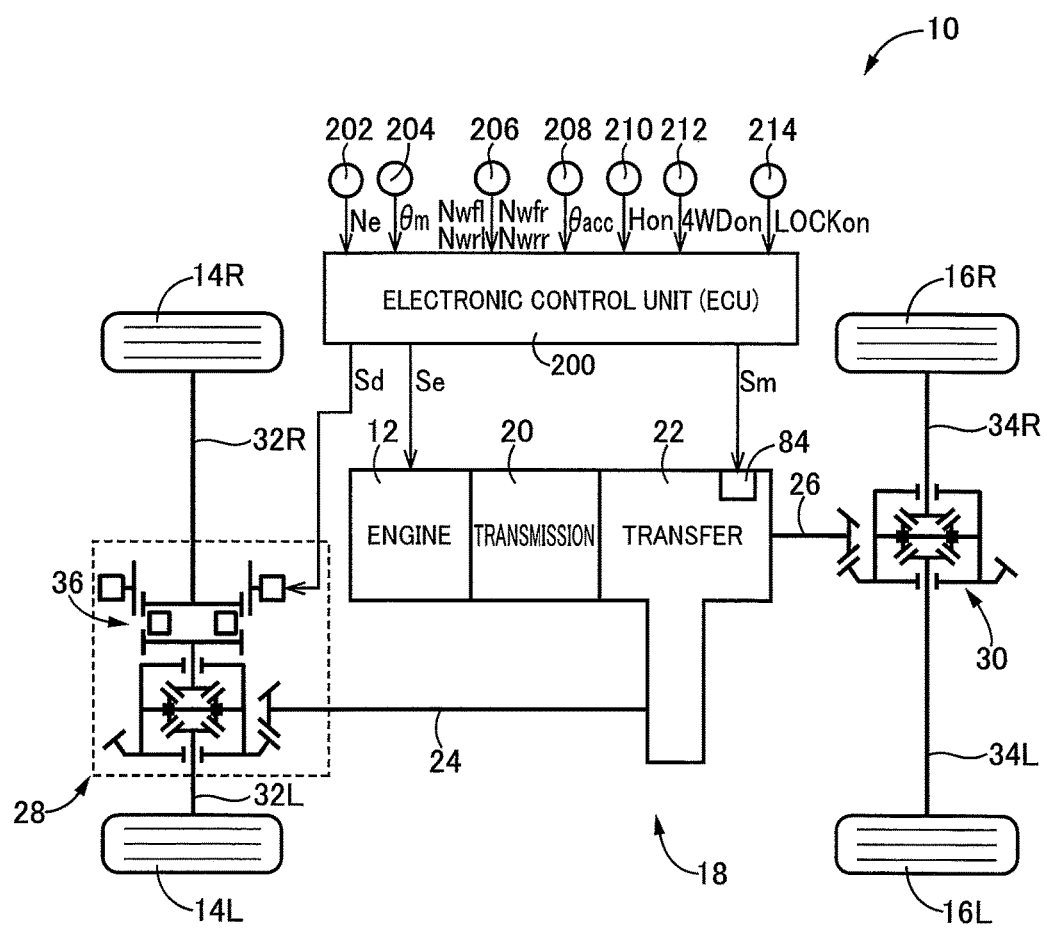
FIG. 1 is a view schematically showing a construction of a vehicle to which the present invention is applicable, and also showing main portions of a control system for various controls executed in the vehicle.

FIG. 1 is a view schematically showing a structure of a vehicle 10 to which the embodiment may be applied, and shows main portions of a control system for various controls in the vehicle 10. As shown in FIG. 1, the vehicle 10 includes an engine 12 as a driving force source, front left and right wheels 14L, 14R (simply referred to as "front wheels 14" unless otherwise specified), rear left and right wheels 16L, 16R (simply referred to as "rear wheels 16" unless otherwise specified), and a power transmitting apparatus 18 configured to transmit a power supplied from the engine 12 to the front wheels 14 and the rear wheels 16. The rear wheels 16 are main driving wheels which serve as driving wheels during running with four-wheel-drive (4WD) mode as well as during running with two-wheel-drive (2WD) mode. The front wheels 14 are auxiliary driving wheels which serve as driven wheels during running with the two-wheel-drive (2WD) mode and which serve as driving wheels during running with the four-wheel-drive (4WD) mode. The vehicle 10 is a front-engine/rear-wheel-drive (FR) based four-wheel-drive vehicle.

The power transmitting apparatus 18 includes a transmission 20 connected to the engine 12, a transfer 22 for the four-wheel-drive vehicle, which is connected to the transmission 20 and which serves as a front/rear power distributing device, front and rear propeller shafts 24, 26 connected to the transfer 22, a front-wheel differential gear unit 28 connected to the front propeller shaft 24, a rear-wheel differential gear unit 30 connected to the rear propeller shaft 26, front left and right wheel axles 32L, 32R (simply referred to as "front wheel axles 32" unless otherwise specified) connected to the front-wheel differential gear unit 28, and rear left and right wheel axles 34L, 34R (simply referred to as "rear wheel axles 34" unless otherwise specified) connected to the rear-wheel differential gear unit 30. In the power transmitting apparatus 18, a power supplied from the engine 12 is transmitted to the transfer 22 via the transmission 20, and is then transmitted from the transfer 22 to the rear wheels 16 via a rear-wheel-side power transmitting path constituted mainly by the rear propeller shaft 26, the rear-wheel differential unit 30 and the rear wheel axles 34 in this order. Meanwhile, a part of the power that is to be transmitted from the engine 12 toward the rear wheels 16 is distributed toward the front wheels 14 by the transfer 22, so as to be transmitted to the front wheels 14 via a front-wheel-side power transmitting path constituted mainly by the front propeller shaft 24, the front-wheel differential unit 28 and the front wheel axles 32 in this order.

The front-wheel differential gear unit 28 includes a front-side clutch 36 provided in the front wheel axle 32R (i.e., between the front-wheel differential gear unit 28 and the front wheel 14R). The front-side clutch 36 is a dog clutch that is electrically (electromagnetically) controlled to selectively establish and interrupt the power transmitting path between the front-wheel differential gear unit 28 and the front wheel 14R. The front-side clutch 36 may be provided also with a synchronizing mechanism.

Figure 2:
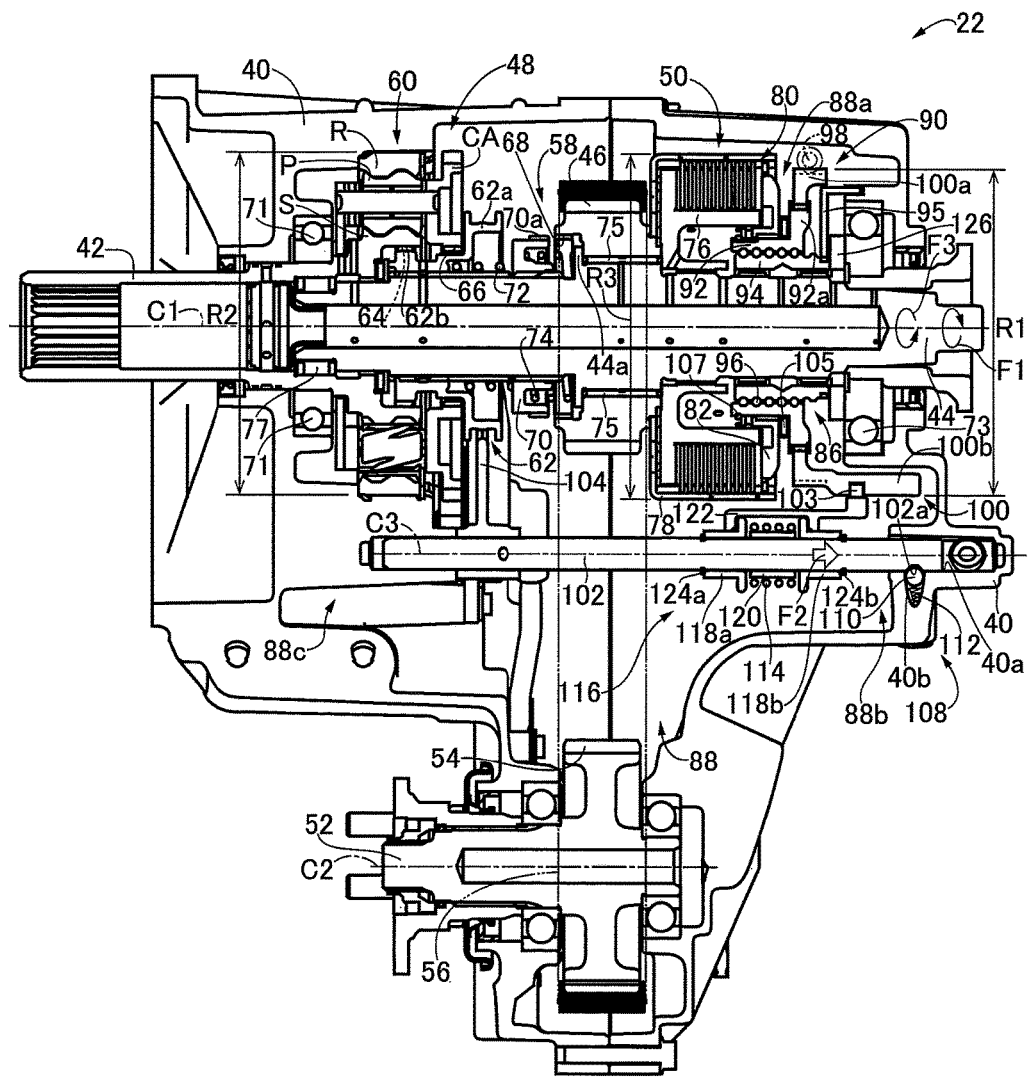
FIG. 2 is a sectional view schematically showing a construction of a transfer according to an embodiment of the invention, and also showing a state in which 2WD running mode is established in a high-speed gear stage.
Figure 3:
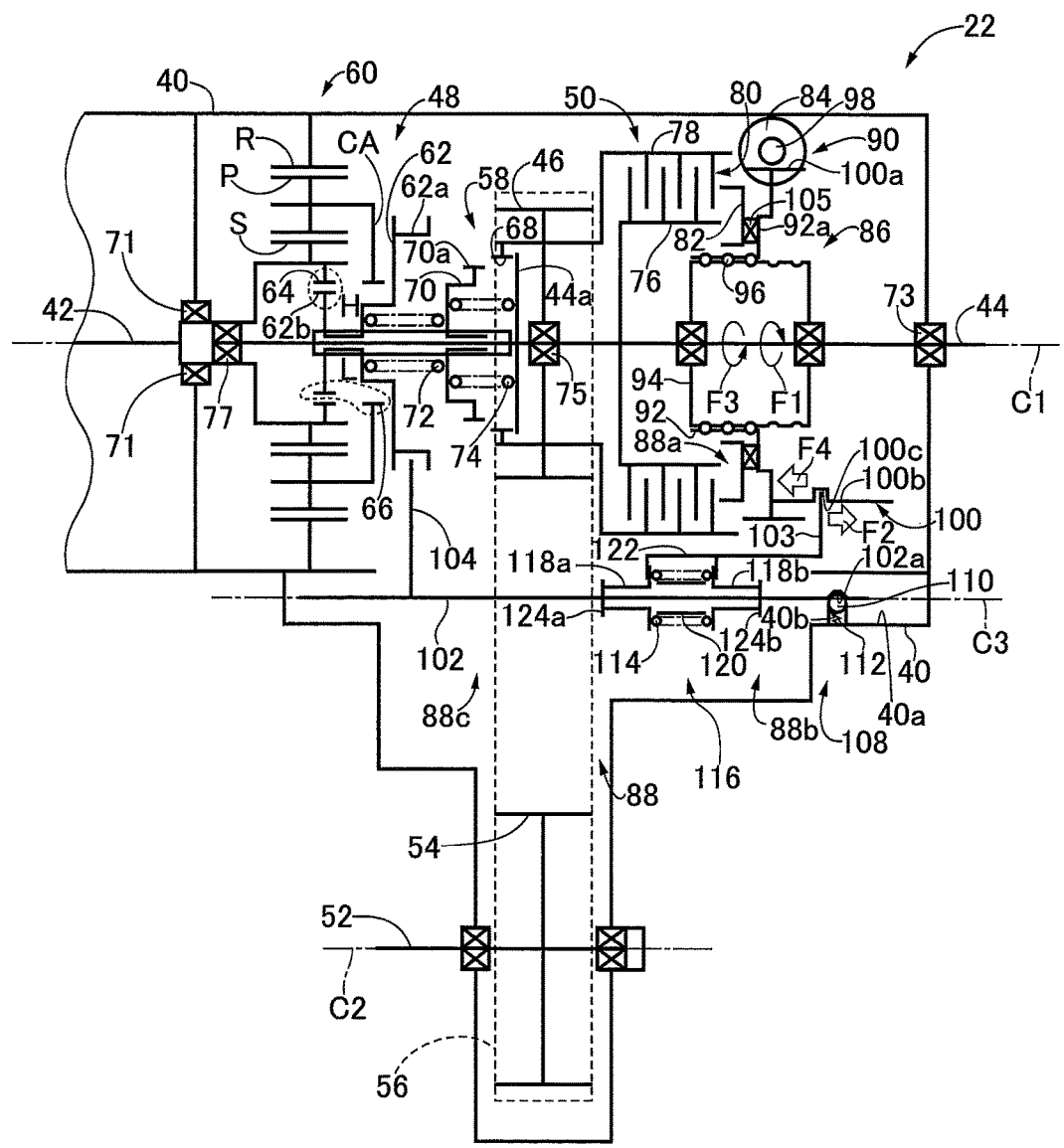
FIG. 3 is a skeleton view schematically showing the construction of the transfer.
Figure 4:
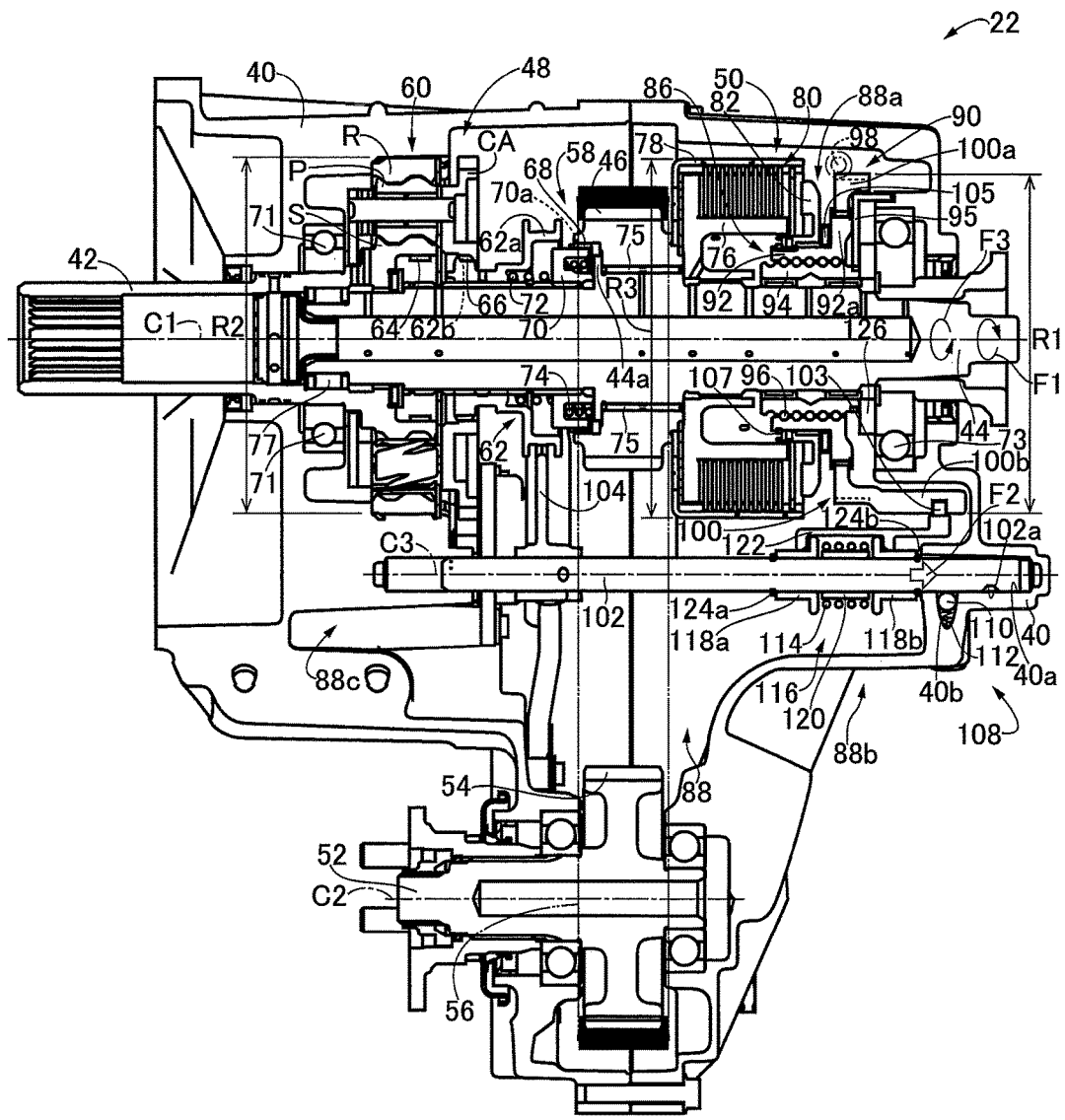
FIG. 4 is a cross sectional view schematically showing the construction of the transfer, and also showing a state in which 4WD running mode with 4WD lock is established in a low-speed gear stage.

FIGS. 2-4 are views schematically showing a construction of the transfer 22. FIGS. 2 and 4 are cross sectional views of the transfer 22, and FIG. 3 is a skeleton view of the transfer 22. As shown in FIGS. 2-4, the transfer 22 includes a transfer case 40 as a non-rotating member. The transfer 22 includes: an input shaft 42 rotatably supported by the transfer case 40; a rear-wheel side output shaft 44 (output shaft) through which the power is to be outputted to the rear wheels 16 as first left and right driving wheels; a sprocket-shaped drive gear 46 (output member) through which the power is to be outputted to the front wheels 14 as second left and right driving wheels so that an output destination of the drive gear 46 is different from that of the rear-wheel side output shaft 44; a high-low switching mechanism 48 serving as an auxiliary transmission and configured to change a speed of rotation inputted to the input shaft 42 and to transmit the rotation to the rear-wheel side output shaft 44; and a front-wheel drive clutch 50 (clutch) in the form of a multi-plate friction clutch configured to adjust a torque that is to be transmitted therethrough from the rear-wheel side output shaft 44 toward the drive gear 46, namely, configured to adjust a part of the power transmitted to the rear-wheel side output shaft 44 and then transmit the adjusted part of the power toward the drive gear 46. The above-described input shaft 42, rear-wheel side output shaft 44, sprocket-shaped drive gear 46, high-low switching mechanism 48 and front-wheel drive clutch 50 (clutch) are all disposed on a first axis C1 as a common axis. The input shaft 42 and the rear-wheel side output shaft 44 are coaxial with each other and rotatably supported by the transfer case 40 via a first support bearing 71 and a second support bearing 73 (output-shaft support bearing). The drive gear 46 is supported by the rear-wheel side output shaft 44 via a third support bearing 75 such that the drive gear 46 is rotatable relative to the output shaft 44 that is coaxial with the drive gear 46. That is, the input shaft 42, rear-wheel side output shaft 44 and drive gear 46 are held by the transfer case 40 and rotatable about the first axis C1. That is, the input shaft 42, rear-wheel side output shaft 44 and drive gear 46 are arranged on the first axis C1 that is common to these elements. It is noted that the rear-wheel side output shaft 44 is rotatably supported at its front end portion by a bearing 77 that is radially interposed between a rear end portion of the input shaft 42 and the front end portion of the output shaft 44, and at its rear end portion (i.e., one of opposite end portions that is on the side of a drum cam 100 described below) by the above-described second support bearing 73.

As shown in FIGS. 2-4, the transfer 22 has a front-wheel side output shaft 52 and a sprocket-shaped driven gear 54 that are provided inside the transfer case 40. The front-wheel side output shaft 52 and the sprocket-shaped driven gear 54, which are integral with each other, are both disposed on a second axis C2 that is parallel to the first axis C1. The transfer 22 further has a front-wheel drive chain 56 that is looped over the drive gear 46 and the driven gear 54, and a 4WD locking mechanism 58 serving as a dog clutch that is configured to integrally connect the rear-wheel side output shaft 44 and the drive gear 46.

The input shaft 42 is connected to an output shaft (not shown) of the transmission 20 through a suitable joint (not shown), and is to be rotated by a drive force (torque) that is to be inputted to the input shaft 42 from the engine 12 through the transmission 20. The rear-wheel side output shaft 44 is a main drive shaft connected to the rear propeller shaft 26. The drive gear 46 is rotatable relative to the rear-wheel side output shaft 44. The front-wheel side output shaft 52 is an auxiliary drive shaft connected to the front propeller shaft 24 through a suitable joint (not shown).

The transfer 22 constructed as described above is configured to transmit the power transmitted from the transmission 20, toward only the rear wheels 16 or toward the front wheels 14 as well as toward the rear wheels 16, by causing the front-wheel drive clutch 50 to adjust a torque that is to be transmitted through the clutch 50 to the drive gear 46. Further, the transfer 22 is configured to establish one of a 4WD lock state and a 4WD unlock state which is selected depending on an operation of the 4WD locking mechanism 58. When the 4WD lock state is established, the rear propeller shaft 26 and the front propeller shaft 24 are unrotatable relative to each other, so that a difference in rotation speed therebetween is not caused. When the 4WD unlock state is established, the two shafts 26, 24 are rotatable relative to each other, so that the difference in rotation speed therebetween is caused. Moreover, the transfer 22 is configured to change a speed of rotation transmitted from the transmission 20, by establishing a selected one of a high-speed gear stage H and a low-speed gear stage L, and to transmit the rotation toward the rear wheels 16 or toward the front and rear wheels 14, 16. Thus, while transmitting the rotation inputted to the input shaft 42, to the rear-wheel side output shaft 44 through the high-low switching mechanism 48, the transfer 22 does not transfer the power from the rear-wheel side output shaft 44 toward the front-wheel side output shaft 52 during a certain state, but transfers the power from the rear-wheel side output shaft 44 toward the front-wheel side output shaft 52 through the drive gear 46, front wheel drive chain 56 and driven gear 54 during another state. The above-described certain state is a state in which the torque to be transmitted through the front-wheel drive clutch 50 is zeroed and the 4WD locking mechanism 58 is released. The above-described another state is a state in which the torque to be transmitted through the front-wheel drive clutch 50 is not zeroed or the 4WD locking mechanism 58 is engaged.

Specifically, the high-low switching mechanism 48 includes a single pinion planetary gear set 60 and a high-low sleeve 62. The planetary gear set 60 includes a sun gear S (first rotary element) that is connected to the input shaft 42 so as to be unrotatable relative to the input shaft 42 about the first axis C1, a ring gear R that is substantially coaxial with the sun gear S and is connected to the transfer case 40 so as to be unrotatable about the first axis C1, and a carrier CA (second rotary element) that supports a plurality of pinions P that are in mesh with the sun gear S and the ring gear R such that each of the pinions P is rotatable and revolvable about the sun gear S. Thus, a rotation speed of the sun gear S is the same as that of the input shaft 42, and a rotation speed of the carrier CA is lower than that of the input shaft 42. High-side gear teeth 64 are fixed on an inner circumferential surface of the sun gear S. Low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed gear stage H. The low-side gear teeth 66 are spline teeth that output rotation at a lower speed than the high-side gear teeth 64 and are involved with establishing the low-speed gear stage L. The high-low sleeve 62 is in spline engagement with the rear-wheel side output shaft 44 in a manner that allows the sleeve 62 to be movable relative to the rear-wheel side output shaft 44 in parallel to the first axis C1. The high-low sleeve 62 has a fork connecting portion 62a, and outer peripheral teeth 62b that are integrally provided adjacent to the fork connecting portion 62a and are to mesh with one of the high-side gear teeth 64 and the low-side gear teeth 66 which is selected depending on movement of the high-low sleeve 62 in parallel to the first axis C1. With meshing engagement of the high-side gear teeth 64 and the outer peripheral teeth 62b, rotation at the same speed as the rotation of the input shaft 42 is transmitted to the rear-wheel side output shaft 44. With meshing engagement of the low-side gear teeth 66 and the outer peripheral teeth 62b, rotation at a lower speed than the rotation of the input shaft 42 is transmitted to the rear-wheel side output shaft 44. The high-side gear teeth 64 and the high-low sleeve 62 function as a high-speed gear stage clutch for establishing the high-speed gear stage H, and the low-side gear teeth 66 and the high-low sleeve 62 function as a low-speed gear stage clutch for establishing the low-speed gear stage L.

The 4WD locking mechanism 58 has locking teeth 68 fixed on an inner circumferential surface of the drive gear 46, and a locking sleeve 70 that is in spline engagement with the rear-wheel side output shaft 44 so as to be movable in parallel to the first axis C1 and unrotatable relative to the rear-wheel side output shaft 44. The locking sleeve 70 has outer peripheral teeth 70a which are fixed to its outer circumferential surface, and which are to be brought into meshing engagement with the locking teeth 68 by movement of the locking sleeve 70 along the first axis C1. The transfer 22 is configured, when the outer peripheral teeth 70a of the locking sleeve 70 are in meshing engagement with the locking teeth 68, to establish the 4WD lock state in which the rear-wheel side output shaft 44 and the drive gear 46 are rotatable integrally with each other.

The high-low sleeve 62 is disposed on one of axially opposite sides of the first support bearing 71 (that supports the input shaft 42), more specifically, one of axially opposite sides of the planetary gear set 60, which is on side of the drive gear 46. The locking sleeve 70 is disposed in a space between the high-low switching mechanism 48 and the drive gear 46, so as to be adjacent to the high-low sleeve 62 that is not integral with the locking sleeve 70. The transfer 22 has a first spring 72 which is disposed between the high-low sleeve 62 and the locking sleeve 70, and which is in contact with the high-low sleeve 62 and the locking sleeve 70. The first spring 72 is pre-loaded to bias or force the high-low sleeve 62 and the locking sleeve 70 in directions away from each other. The transfer 22 has also a second spring 74 which is disposed between the drive gear 46 and the locking sleeve 70, and which is in contact with the locking sleeve 70 and a protruding portion 44a of the rear-wheel side output shaft 44. The second spring 74 is pre-loaded to bias or force the locking sleeve 70 in a direction away from the locking teeth 68. The biasing force of the first spring 72 is set to be larger than that of the second spring 74. The protruding portion 44a is constituted by a flange portion of the rear-wheel side output shaft 44, which is located in a space radially inside the drive gear 46 and which protrudes toward the locking teeth 68. The high-side gear teeth 64 are disposed in one of opposite sides of the low-side gear teeth 66, which is remote from the locking sleeve 70 in a direction parallel to the first axis C1. The outer peripheral teeth 62b of the high-low sleeve 62 are brought into meshing engagement with the high-side gear teeth 64 when the high-low sleeve 62 is positioned in a position remote from the locking sleeve 70 (i.e., left-side position as seen in FIGS. 2 and 3), and are brought into meshing engagement with the low-side gear teeth 66 when the high-low sleeve 62 is positioned in a position close to the locking sleeve 70 (i.e., right-side position as seen in FIGS. 2 and 3). The outer peripheral teeth 70a of the locking sleeve 70 are brought into meshing engagement with the locking teeth 68 when the locking sleeve 70 is positioned in a position close to the drive gear 46 (i.e., right-side position as seen in FIGS. 2 and 3). Thus, the outer peripheral teeth 70a of the locking sleeve 70 are in meshing engagement with the locking teeth 68 when the outer peripheral teeth 62b of the high-low sleeve 62 are in meshing engagement with the low-side gear teeth 66.

The front-wheel drive clutch 50 is a multi-plate friction clutch that includes: a clutch hub 76 connected to the rear-wheel side output shaft 44 and unrotatable relative to the output shaft 44; a clutch drum 78 connected to the drive gear 46 and unrotatable relative to the drive gear 46; a friction engagement element 80 interposed between the clutch hub 76 and the clutch drum 78 and configured to selectively connect and disconnect the clutch hub 76 and the clutch drum 78; and a piston 82 configured to press the friction engagement element 80. The front-wheel drive clutch 50 is disposed on the first axis C1, and is located on one of opposite sides of the drive gear 46, which is remote from the high-low switching mechanism 48, in the direction of the first axis C1. In the front-wheel drive clutch 50, the friction engagement element 80 is pressed by the piston 82 that is moved in a direction toward the drive gear 46. The front-wheel drive clutch 50 is placed in its released state when the piston 82 is separated from the friction engagement element 80 as a result of movement of the piston 82 in a non-pressing side direction (i.e., right side as seen in FIGS. 2 and 3), namely, in a direction which is parallel to the first axis C1 and which is away from the drive gear 46. When the piston 82 is brought into contact with the friction engagement element 80 as a result of movement of the piston 82 in a pressing side direction (i.e., left side as seen in FIGS. 2 and 3), namely, in a direction which is parallel to the first axis C1 and which is toward the drive gear 46, the front-wheel drive clutch 50 is placed in its released state, slipping state or engaged state, depending on a transmission torque (torque capacity) that is adjusted by an amount of the movement of the piston 82.

When the front-wheel drive clutch 50 is in the released state and the 4WD locking mechanism 58 is in the released state in which the outer peripheral teeth 70 of the locking sleeve 70 are not in meshing engagement with the locking teeth 68, the transfer 22 transfers the power transmitted from the transmission 20, only towards the rear wheels 16, interrupting the power transmitting path between the rear-wheel side output shaft 44 and the drive gear 46. When the front-wheel drive clutch 50 is in the slipping state or engaged state, the transfer 22 distributes the power transmitted from the transmission 20, to the front wheels 14 and the rear wheels 16. When the front-wheel drive clutch 50 is in the slipping state, the transfer 22 establishes its differential state (4WD unlock state) in which the rear-wheel side output shaft 44 and the drive gear 46 are allowed to be rotated relative to each other. When the front-wheel drive clutch 50 is in the engaged state, the transfer 22 establishes its 4WD lock state in which the rear-wheel side output shaft 44 and the drive gear 46 are rotated integrally as a unit. The ratio of the torque distribution between the front wheels 14 and the rear wheels 16 can be continuously changed to range between 0:100 and 50:50, for example, by controlling the transmission torque of the front-wheel drive clutch 50.

The transfer 22 further has, as devices for operating the above-described high-low switching mechanism 48, front-wheel drive clutch 50 and 4WD locking mechanism 58, an electric motor 84 (see FIG. 3), a screw mechanism 86 configured to convert a rotational motion of the electric motor 84 into a linear motion, and a transmitting mechanism 88 configured to transmit a power of the linear motion of the screw mechanism 86, to the high-low switching mechanism 48, front-wheel drive clutch 50 and the transmitting mechanism 88.

Figure 5:
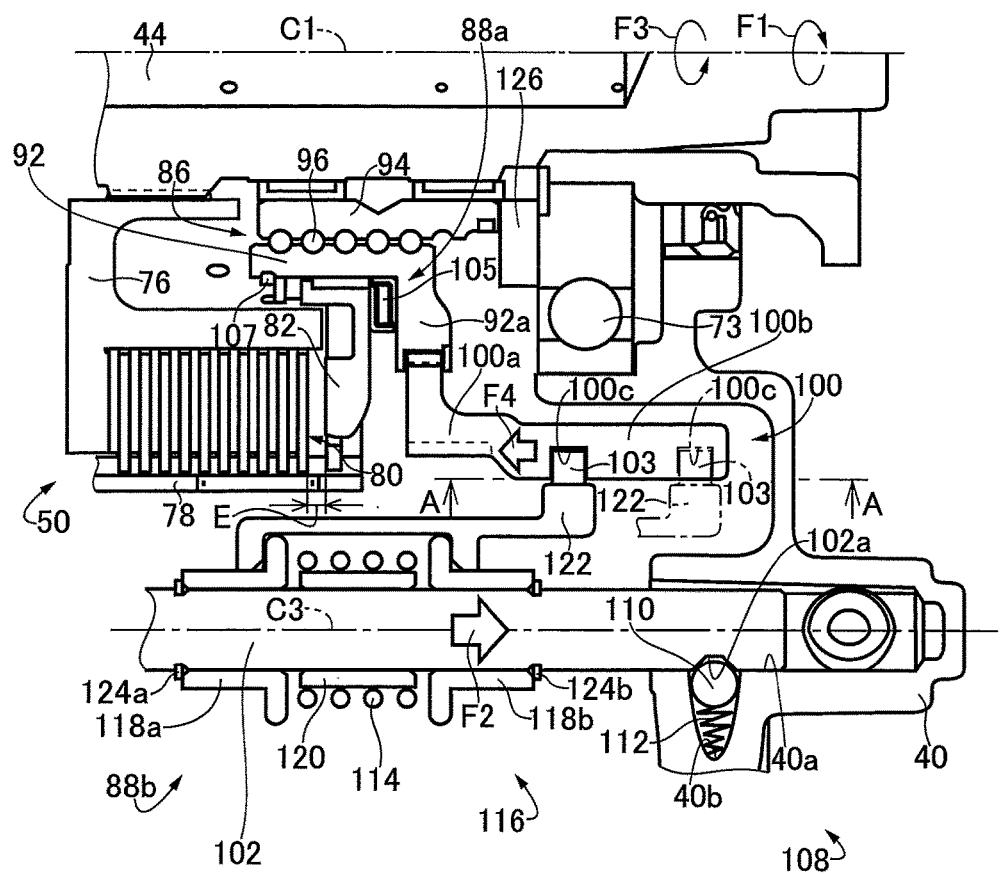
FIG. 5 showing, in enlargement, a part of FIG. 2, so as to show a drum cam provided in the transfer.

The screw mechanism 86 disposed, as well as the rear-wheel side output shaft 44, on the first axis C1, and is located on one of opposite sides of the front-wheel drive clutch 50, which is remote from the drive gear 46. The screw mechanism 86 includes a nut member 92 (internally threaded member) as a rotatable threaded member connected to the electric motor 84 indirectly via a worm gear 90 that is provided in the transfer 22, a screw shaft member 94 (externally threaded member) that is in thread engagement with the nut member 92, and a connecting member 95 that connects a rear end portion of the screw shaft member 94 to the transfer case 40 as a non-rotating member such that the screw shaft member 94 is provided on the rear-wheel side output shaft 44 and serves as an unrotatable threaded member unrotatable about the first axis C1 relative to the transfer case 40. The nut member 92 is in thread engagement with the screw shaft member 94 via a plurality of balls 96, so that the screw mechanism 86 is a ball screw in which the nut member 92 and the screw shaft member 94 are linearly moved relative to each other, with the balls 96 being radially interposed therebetween. In the screw mechanism 86 constructed as described above, with the nut member 92 (as one of the screw shaft member 94 and the nut member 92 which are supported by the rear-wheel side output shaft 44 and are in thread engagement with each other) being rotated by the electric motor 92, the nut member 92 is moved along the first axis C1. The nut member 92 is supported by the rear-wheel side output shaft 44 and rotatable about the first axis C1, owing to the thread engagement of the nut member 92 with the screw shaft member 94. Meanwhile, the screw shaft member 94 is supported by the rear-wheel side output shaft 44, and unrotatable about the first axis C1 owing to the connection of the screw shaft member 94 with the transfer case 40 through the connecting member 95. In the present embodiment, as shown in FIGS. 2 and 5, when the nut member 92 is rotated by the electric motor 84 about the first axis C1 in a direction of arrow F1 (first rotating direction), the nut member 92 is moved along the first axis C1 in a direction of arrow F2, i.e., in a direction away from the front-wheel drive clutch 50, owing to the thread effect. Further, as shown in FIGS. 2 and 5, when the nut member 92 is rotated by the electric motor 84 about the first axis C1 in a direction of arrow F3 (second rotating direction), i.e., in a direction opposite to the direction of arrow F1, the nut member 92 is moved along the first axis C1 in a direction of arrow F4, i.e., in a direction opposite to the direction of arrow F2, owing to the thread effect.

The worm gear 90 is a pair of gears consisting of a worm 98 integrally formed on a shaft of the electric motor 84, and a worm wheel 100*a* formed on the drum cam 100 that is connected to a flange portion 92*a* provided in a rear end portion of the nut member 92. Rotation of the electric motor 84 (that is constituted by, for example, a brushless motor) is transmitted to the nut member 92 via the worm gear 90, while being decelerated. The screw mechanism 86 coverts a rotational motion transmitted to the nut member 90, into a linear motion of the nut member 92. With the rotation of the electric motor 84, the worm wheel 100*a* formed on the drum cam 100 connected or fixed to the nut member 92, is moved along the first axis C1. The worm wheel 100*a* has a width (as measured in the direction of the first axis C1) that is larger than a width (as measured in the direction of the first axis C1) of the worm 98 formed on the shaft of the electric motor 84 that is fixed to the transfer case 40, so that the worm wheel 100*a* is constantly held in meshing engagement with the worm 98 irrespective of the movement of the worm wheel 100*a* along the first axis C1. The worm wheel 100*a* has an outer peripheral teeth that are spur teeth.

The transmitting mechanism 88 has a first transmitting mechanism 88*a* and a second transmitting mechanism 88*b*. The first transmitting mechanism 88*a* transmits a force of the movement of the nut member 92 of the screw mechanism 86, to the front-wheel drive clutch 50. The second transmitting mechanism 88*b* includes a cam engaging member 103 fitted in a cam groove 100*c* that is formed in the drum cam 100, and moves a fork shaft 102 along a third axis C3 as a parallel axis in a response to rotation of the nut member 92 about the first axis C1, namely, in a response to rotation of the drum cam 100 about the first axis C1. The fork shaft 102 is disposed on the third axis C3 that is parallel to the first axis C1 inside the transfer case 40, and is supported by the transfer case 40, movably along the third axis C3. The first axis C1, second axis C2 and third axis C3 are parallel to one another.

As shown in FIGS. 2 and 5, the drum cam 100 has the annular-shaped worm wheel 100*a* that meshes with the worm 98 formed on the shaft of the electric motor 84, a protruding portion 100*b* that protrudes from an axial end portion of the worm wheel 100*a* in a direction toward the rear propeller shaft 26, and the cam groove 100*c* that is formed in an outer circumferential surface of the protruding portion 100*b*. The protruding portion 100*b* consists of a part-cylindrical-shaped portion that extends towards the rear propeller shaft 26, from a lower part of the worm wheel 100*a* as seen in FIGS. 2 and 5, namely, from a circumferential part of the worm wheel 100*a*, which is on the side of the fork shaft 102. The second support bearing 73 supports one of opposite end portions of the rear-wheel side output shaft 44, which is on the side of the drum cam 100, such that the output shaft 44 is rotatable. The second support bearing 73 is disposed radially inside the annular-shaped drum cam 100, within an axial length of the drum cam 100 as measured in the direction of the first axis C1. A diameter R1 of the drum cam 100 is not larger than a diameter R2 of the high-low switching mechanism 48 and a diameter R3 of the front-wheel drive clutch 50. The diameter R2 corresponds to an outside diameter of the ring gear R or the carrier CA of the high-low switching mechanism 48. The diameter R3 corresponds to an outside diameter of the clutch drum 78 of the front-wheel drive clutch 50.

As shown in FIGS. 6A-C and 7A-B, the cam groove 100*c* formed in the outer circumferential surface of the drum cam 100 includes: a first inclined section 100*d* and a second inclined section 100*e* each of which extends in a direction inclined with respect to a circumferential direction of the annular-shaped drum cam 100, namely, in a direction having a component parallel to the circumferential direction and also a component parallel to an axial direction of the drum cam 100; a first non-inclined section 100*f* extending in the circumferential direction from a rear end, as viewed in the direction of arrow F1, of the first inclined section 100*d*; a second non-inclined section 100*g* extending in the circumferential direction from a front end, as viewed in the direction of arrow F1, of the second inclined section 100*d*; and a connecting section 100*h* (circumferentially central section) connecting a front end, as viewed in the direction of arrow F1, of the first inclined section 100*d* and a rear end, as viewed in the direction of arrow F1, of the second inclined section 100e. The first inclined section 100d is inclined with respect to the circumferential direction such that this section 100d extends in the direction of arrow F2 as this section 100d extends in the direction of arrow F3 (that is opposite to the direction of arrow F1). The second inclined section 100e is inclined with respect to the circumferential direction such that this section 100e extends in the direction of arrow F2 as this section 100d extends in the direction of arrow F1. That is, the first inclined section 100d extends from one of circumferentially opposite ends of the connecting section 100h as a circumferentially central section, in a direction inclined with respect to the connecting section 100h, and has a circumferentially distal end that is distant from the connecting section 100h by a first distance in an axial direction of the drum cam 100. The second inclined section 100e extends from the other of circumferentially opposite ends of the connecting section 100h, in a direction inclined with respect to the connecting section 100h, and has a circumferentially distal end that is distant from the connecting section 100h in the axial direction by a second distance that is smaller than the above-described first distance. The second non-inclined section 100g extends in a direction parallel to the connecting section 100h, from the circumferentially distal end of the second inclined section 100e that is located between the second non-inclined section 100e and the connecting section 100h in the circumferential direction.

Figure 6C:
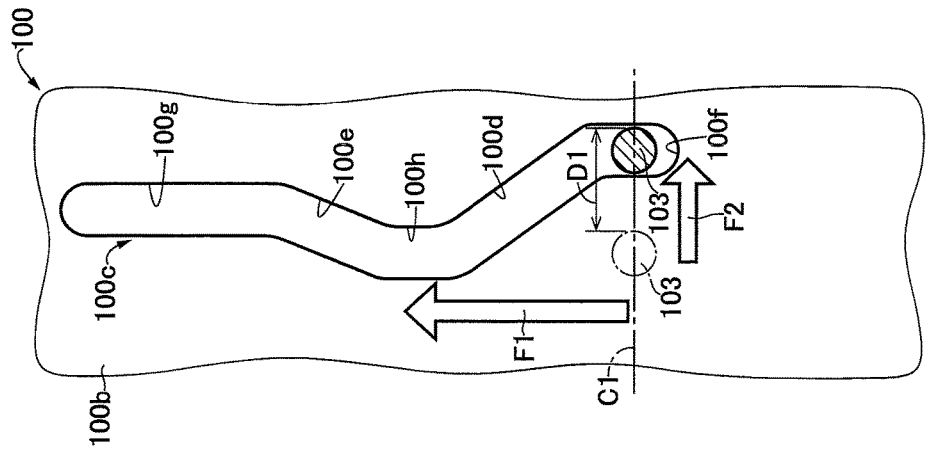
Figure 6B:
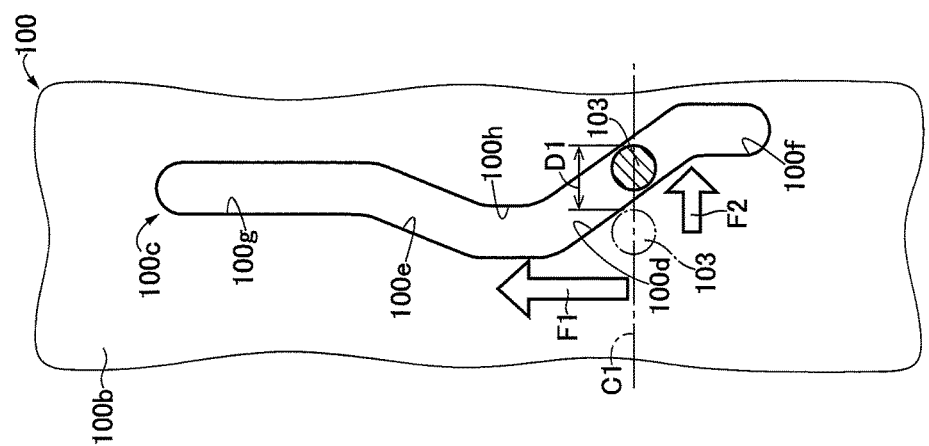
Figure 6A:
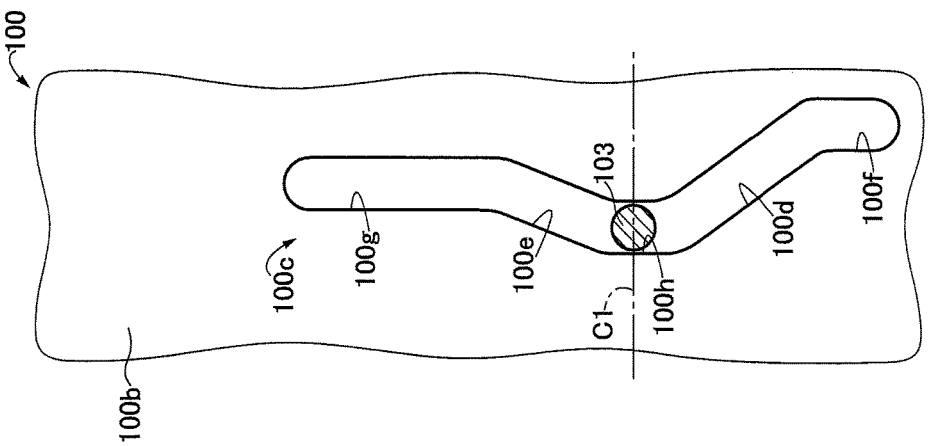

When the nut member 92 and the drum cam 100 are rotated by the electric motor 84 about the first axis C1 in the direction of arrow F1 from a state in which the cam engaging member 103 is positioned within the connecting section 100h of the cam groove 100c of the drum cam 100, as shown in FIG. 6A and FIG. 7A, the can engaging member 103 is moved along the first inclined section 100d of the cam groove 100c so that the can engaging member 103 is moved in the direction of arrow F2, by a distance D1 that is larger than a distance by which the nut member 92 is moved relative to the screw shaft member 94 in the direction of arrow F2 owing to the thread effect exhibited by its cooperation with the screw shaft member 94. In this instance, the fork shaft 102, together with the cam engaging member 103, is moved in the direction of arrow F2. When the nut member 92 and the drum cam 100 are rotated by the electric motor 84 about the first axis C1 in the direction of arrow F3 (that is opposite to the direction of arrow F1) from a state in which the cam engaging member 103 is positioned within the first non-inclined section 100f of the cam groove 100c of the drum cam 100, as shown in FIG. 6C, the can engaging member 103 is moved along the first inclined section 100d of the cam groove 100c so that the can engaging member 103 is moved in the direction of arrow F4 (that is opposite to the direction of arrow F2), by the distance D1 that is larger than a distance by which the nut member 92 is moved relative to the screw shaft member 94 in the direction of arrow F4. In this instance, the fork shaft 102, together with the cam engaging member 103, is moved in the direction of arrow F4. Thus, when the drum cam 100 is rotated about the first axis C1, the fork shaft 102 is moved by the first inclined section 100d in one of opposite directions parallel to the third axis C3, whereby the high-low switching mechanism 48 is caused to switches between the high-speed gear stage H and the low-speed gear stage L, by the movement of the fork shaft 102 along the third axis C3, which is transmitted through a fork 104 described below. That is, the first inclined section 100d is inclined with respect to the circumferential direction such that high-low switching mechanism 48 is caused to switch between the high-speed gear stage H and low-speed gear stage L by the movement of the fork shaft 102 along the third axis C3, which is transmitted through the fork 104. A circle indicated by one-dot chain line in each of FIG. 6B and FIG. 6C represents a position of the cam engaging member 103 in the corresponding state.

FIG. 6A is a view showing a position of the cam engaging member 103 when the drum cam 100 is positioned in H2 rotational position whereby the fork shaft 102 is positioned in the high-speed-gear-stage establishing position in the direction of the third axis C3. FIG. 6C is a view showing the position of the cam engaging member 103 when the drum cam 100 is positioned in L4 rotational position whereby the fork shaft 102 is positioned in the low-speed-gear-stage establishing position in the direction of the third axis C3. FIG. 6B is a view showing the position of the cam engaging member 103 when the drum cam 100 is in, for example, a transition from the H2 rotational position to L4 rotational position. When the drum cam 100 is positioned in the H2 rotational position, the high-speed gear stage H is established in the high-low switching mechanism 48, and the piston 82 as a pressing portion of the first transmitting mechanism 88a is spaced apart from the friction engagement element 80 as a pressing-force receiving portion of the front-wheel drive clutch 50 by a certain distance E in the direction of the first axis C1, namely, a clearance E (see FIGS. 5 and 8) is defined in the front-wheel drive clutch 50. That is, with the drum cam 100 being positioned in the H2 rotational position, the outer peripheral teeth 62b of the high-low sleeve 62 mesh with the high-side gear teeth 64 while the transmission of a part of the power of the rear-wheel side output shaft 44 to the drive gear 46 is shut off in the front-wheel drive clutch 50. When the drum cam 100 is positioned in the L4 rotational position, the low-speed gear stage L is established in the high-low switching mechanism 48, and the rear-wheel side output shaft 44 and the drive gear 46 are connected, by the 4WD locking mechanism 58, so as to be unrotatable relative to each other about the first axis C1. That is, with the drum cam 100 being positioned in the L4 rotational position, the outer peripheral teeth 62b of the high-low sleeve 62 mesh with the low-side gear teeth 66 while meshing teeth 70a of the locking sleeve 70 mesh with the locking teeth 68 of the drive gear 46. When the fork shaft 102 is positioned in the high-speed-gear-stage establishing position, the outer peripheral teeth 62b of the high-low sleeve 62 mesh with the high-side gear teeth 64 whereby the high-speed gear stage H is established in the high-low switching mechanism 48. When the fork shaft 102 is positioned in the low-speed-gear-stage establishing position, the outer peripheral teeth 62b of the high-low sleeve 62 mesh with the low-side gear teeth 64 whereby the low-speed gear stage L is established in the high-low switching mechanism 48.

FIG. 7A is a view showing a position of the cam engaging member 103 when the drum cam 100 is positioned in the H2 rotational position. FIG. 7B is a view showing a position of the cam engaging member 103 when the drum cam 100 is positioned in H4 rotational position. When the drum cam 100 is positioned in the H4 rotational position, the high-speed gear stage H is established in the high-low switching mechanism 48, and the piston 82 of the first transmitting mechanism 88a is in contact with the friction engagement element 80 of the front-wheel drive clutch 50. That is, with the drum cam 100 being positioned in the H4 rotational position, the outer peripheral teeth 62b of the high-low sleeve 62 mesh with the high-side gear teeth 64 while a part of the power of the rear-wheel side output shaft 44 is transmitted to the drive gear 46 through the front-wheel drive clutch 50.

The transfer 22 includes a gear-position holding mechanism 108 configured to hold the high-speed-gear-stage establishing position of the fork shaft 102. As shown in FIG. 5, the gear-position holding mechanism 108 has: a receiving hole 40b formed in a sliding surface 40a of the transfer case 40 on which the fork shaft 102 is to be slid; a locking ball 110 (locking member) received in the receiving hole 40b; a locking spring 112 received in the receiving hole 40b and biasing or forcing the locking ball 110 toward the fork shaft 102; and a recessed portion 102a formed in an outer circumferential surface of the fork shaft 102, so as to receive a part of the locking ball 110 when the fork shaft 102 is positioned in the high-speed-gear-stage establishing position. In the gear-position holding mechanism 108 constructed as described above, when the fork shaft 102 is moved to the high-speed-gear-stage establishing position, namely, when the drum cam 100 is rotated to the H2 rotational position, the movement of the fork shaft 102 along the third axis C3 from the high-speed-gear-stage establishing position is restricted by the locking ball 110 whereby the fork shaft 102 is held in the high-speed-gear-stage establishing position.

As shown in FIGS. 2 through 5, the first transmitting mechanism 88a includes: the above-described piston 82 configured to press the friction engagement element 80 of the front-wheel drive clutch 50; a thrust bearing 105 interposed between the piston 82 and the flange portion 92a of the nut member 92; and a stopper member 107 that inhibits movement of the piston 82 relative to the nut member 92 in a direction toward the friction engagement element 80. The piston 82 is connected to the nut member 92 through the thrust bearing 105 and the stopper member 107, such that the piston 82 is unmovable along the first axis C1 and rotatable about the first axis C1, relative to the nut member 92. Thus, a force of the movement of the nut member 92 of the screw mechanism 86 along the first axis C1 is transmitted to the friction engagement element 80 of the front-wheel drive clutch 50 through the first transmitting mechanism 88a.

FIG. 7A shows a state in which the drum cam 100 is positioned in the H2 rotational position, namely, in which the movement of the fork shaft 102 in the direction of the third axis C3 is restricted by the locking ball 110 of the gear-position holding mechanism 108 whereby the movement of the cam engaging member 103 in the direction of the first axis C1 is restricted. When the nut member 92 and the drum cam 100 are rotated by the electric motor 84 in the direction of arrow F3 about the first axis C1, from the state shown in FIG. 7A, the drum cam 100 is moved relative to the cam engaging member 103 that is engaged in the second inclined section 100e of the cam groove 100c formed in the drum cam 100, so that the drum cam 100 is moved in the direction of arrow F4 by a distance D2 that is larger than a distance by which the nut member 92 is moved relative to the screw shaft member 94 in the direction of arrow F4 owing to the thread effect exhibited by its cooperation with the screw shaft member 94. The cam groove 100c indicated by one-dot chain line in FIG. 7A represents a position of the cam groove 100c when the drum cam 100 is positioned in the H4 rotational position.

Figure 8:
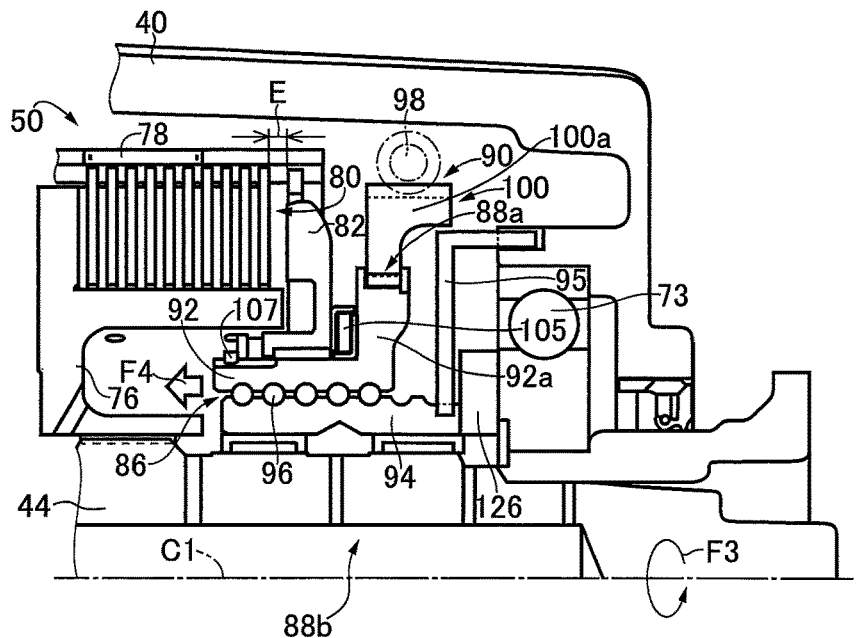
FIG. 8 is a view showing positions of a first transmitting mechanism and a screw mechanism when the drum cam is positioned in the H2 rotational position.
Figure 9:
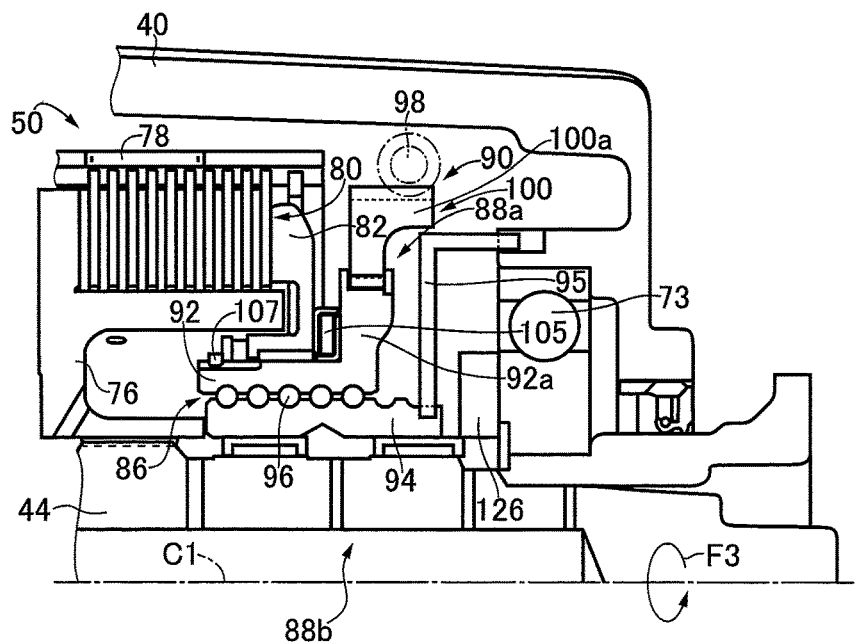
FIG. 9 is a view showing the positions of the first transmitting mechanism and the screw mechanism when the drum cam is positioned in the H4 rotational position.

When the drum cam 100 is moved in the direction of arrow F4 (pressing-force generating direction) by its rotation from the H2 rotational position shown in FIG. 7A to the H4 rotational position shown in FIG. 7B, elements (such as the screw mechanism 86 and the first transmitting mechanism 88a) integrally fixed to the drum cam 100 are moved in the direction of arrow F4 along the first axis C1, as shown in FIGS. 8 and 9, whereby the piston 82 of the first transmitting mechanism 88a is brought into contact with the friction engagement element 80 of the front-wheel drive clutch 50, thereby eliminating the clearance E in the front-wheel drive clutch 50. Thus, when the drum cam 100 is rotated about the first axis C1 in the direction of arrow F3 with the movement of the fork shaft 102 in the direction of the third axis C3 being restricted by the locking ball 110, the drum cam 100 is moved in the direction of arrow F4 by the second inclined section 100e of the cam groove 100c of the drum cam 100, the screw mechanism 86 fixed to the drum cam 100 is moved in the direction of arrow F4 along the first axis C1 by the electric motor 84, with the fork shaft 102 being in the high-speed-gear-stage establishing position that establishes the high-speed gear stage H in the high-low switching mechanism 48, whereby the first transmitting mechanism 88a is brought into contact with the friction engagement element 80 of the front-wheel drive clutch 50. That is, the second inclined section 100e is inclined with respect to the circumferential direction such that, with the fork shaft 102 being positioned in the high-speed-gear-stage establishing position that establishes the high-speed gear stage H in the high-low switching mechanism 48, the screw mechanism 86 is moved in the direction of arrow F4 along the first axis C1 by rotation of the electric motor 84, whereby the first transmitting mechanism 88a is brought into contact with the friction engagement element 80 of the front-wheel drive clutch 50. The screw shaft member 94 of the screw mechanism 86 is supported by the rear-wheel side output shaft 44 and is movable along the first axis C1 relative to the output shaft 44, so that the screw mechanism 86 and the first transmitting mechanism 88a are moved in the direction of arrow F4 when the drum cam 100 is moved in the direction of arrow F4. FIG. 8 is a view showing positions of the respective first transmitting mechanism 88a and screw mechanism 86 when the drum cam 100 is in the H2 rotational position. FIG. 9 is a view showing positions of the respective first transmitting mechanism 88a and screw mechanism 86 when the drum cam 100 is in the H4 rotational position.

When the nut member 92 and the drum cam 100 are further rotated, by the electric motor 84, in the direction of arrow F3 about the first axis C1, from a state in which the drum cam 100 is positioned in the H4 rotational position as shown in FIG. 7B, namely, from a state in which the piston 82 is in contact with the friction engagement element 80 of the front-wheel drive clutch 50 as shown in FIG. 9, the nut member 92 is moved in the direction of arrow F4 relative to the screw shaft member 94 owing to the thread effect while the screw shaft member 94 is moved in a direction toward an annular member 126 that is adjacent to the second support bearing 73. In this instance, the screw shaft member 94 is moved in the direction toward the annular member 126, by a reaction force acting against the pressing force applied from the piston 82 to the friction engagement element 80. With the drum cam 100 being further rotated about the first axis C1 in the direction of arrow F3, until and even after the screw shaft member 94 is brought into contact with the annular member 126, the piston 82 of the first transmitting mechanism 88a is pressed against the friction engagement element 80 of the front-wheel drive clutch 50, owing to the pressing force of the screw mechanism 86. The cam groove 100c indicated by one-dot chain line in FIG. 7B represents a position of the cam groove 100c when the drum cam 100 has been further rotated from the H4 rotational position.

When the drum cam 100 is to be switched from the H2 rotational position to the L4 rotational position, the drum cam 100 is rotated in the direction of arrow F1 about the first axis C1 with the movement of the fork shaft 102 along the third axis C3 being restricted by the locking ball 110, so that the drum cam 100 is displaced in the direction of arrow F4 by the engagement of the cam engaging member 103 in the first inclined section 100*d* of the cam groove 100*c*. Thus, as in a stage when the drum cam 100 is switched from the H2 rotational position to the H4 rotational position, the piston 82 is once brought into contact with the friction engagement element 80 of the front-wheel drive clutch 50 while the fork shaft 102 is held in the high-speed-gear-stage establishing position. Then, with further rotation of the drum cam 100 in the direction of arrow F1 about the first axis C1, the piston 82 is forced to be moved further in the direction of arrow F4. In this instance, the locking ball 110 of the gear-position holding mechanism 108 is removed from the recessed portion 102*a* of the fork shaft 102, owing to the reaction force acting against the pressing force applied from the piston 82 to the friction engagement element 80, so that the cam engagement member 103 and the fork shaft 102 are eventually moved in the direction of arrow F2 by the engagement of the cam engagement member 103 in the first inclined section 100*d* of the cam groove 100*c*. The locking spring 112 of the gear-position holding mechanism 108 has a biasing force whose magnitude is experimentally set, such that the locking ball 110 is removed from the recessed portion 102*a* of the fork shaft 102, when the drum cam 100 is switched from the H2 rotational position to the L4 rotational position, namely, when the high-low switching mechanism 48 is switched from the high-speed gear stage H to the low-speed gear stage L, and such that the locking ball 100 is engaged in the recessed portion 102*a* of the fork shaft 102 for thereby causing the piston 82 to apply the friction engagement element 80 a suitable magnitude of the pressing force, until the screw shaft member 94 is brought into contact with the annular member 126, when the drum cam 100 is switched from the H2 rotational position to the H4 rotational position. The above-described suitable magnitude of the pressing force may be, for example, a magnitude that increases a rotation speed of the front propeller shaft 24 and other rotary elements that are not rotated when the front-wheel drive clutch 50 is in the released state.

As shown in FIGS. 2 through 5, the second transmitting mechanism 88*b* is provided with a waiting mechanism 116 that is configured to transmit a motion of the cam engaging member 103 in the direction of the first axis C1, to the fork shaft 102 through a spring member 114. Thus, in the transmitting mechanism 88, the motion of the cam engagement member 103 in the direction of the first axis C1 or third axis C3 is transmitted to the high-low sleeve 62 of the high-low switching mechanism 48 via the waiting mechanism 116, the fork shaft 102 and a fork 104 that is described below. Owing to the arrangement, when the cam engaging member 103 is moved in the direction of arrow F2 from the state shown in FIG. 2 and FIG. 6A, the high-low sleeve 62 is moved in a direction toward the drive gear 46, namely, toward a low-speed rotation transmitting position that causes the outer peripheral teeth 62*b* of the high-low sleeve 62 to mesh with the low-side gear teeth 66. When the cam engaging member 103 is moved in a direction opposite to the direction of arrow F2 from the state shown in FIG. 4 and FIG. 6C, the high-low sleeve 62 is moved in a direction away from the drive gear 46, namely, toward a high-speed rotation transmitting position that causes the outer peripheral teeth 62*b* of the high-low sleeve 62 to mesh with the high-side gear teeth 64.

The transmitting mechanism 88 is provided with a third transmitting mechanism 88*c* configured to transmit the rotary motion of the nut member 92 of the screw mechanism 86 toward the 4WD locking mechanism 58. The third transmitting mechanism 88*c* is constituted by components such as the cam engaging member 103 and the waiting mechanism 116, like the second transmitting mechanism 88*b*, and additionally, the fork shaft 102, fork 104, high-low sleeve 62, first spring 72 and second spring 74. The fork 104 is connected to the fork shaft 102, so as to transmit the force of movement of the fork shaft 102 along the third axis C3, to the high-low switching mechanism 48 that is connected to the fork 104. The first spring 72 is disposed between the high-low sleeve 62 and the lock sleeve 70, while being compressed therebetween. The second spring 74 is disposed between the lock sleeve 70 and the protruding portion 44*a* of the rear-wheel side output shaft 44, while being compressed therebetween.

Thus, in the third transmitting mechanism 88*c*, as described above, when the outer peripheral teeth 62*b* of the high-low sleeve 62 is moved, by the movement of the cam engaging member 103 in the direction of arrow F2, to a position for the mesh engagement with the low-side gear teeth 66, a 4WD-locking-direction force is applied through the first spring 72 to the locking sleeve 70, and forces the locking sleeve 70 to be moved toward the drive gear 46, against the biasing force of the second spring 74 which is set to be smaller than that of the first spring 72, whereby the outer peripheral teeth 70*a* are brought into mesh engagement with the locking teeth 68 of the drive gear 46. When the cam engaging member 103 is moved in a direction opposite to the direction of arrow F2 from a state in which the outer peripheral teeth 62*b* of the high-low sleeve 62 mesh with the low-side gear teeth 66, the outer peripheral teeth 62*b* of the high-low sleeve 62 are moved to a position for the mesh engagement with the high-side gear teeth 64, and a 4WD-unlocking-direction force is applied to the locking sleeve 70 whereby the locking sleeve 70 is separated from the drive gear 46 by the second spring 74. Thus, the locking sleeve 70 is moved by the biasing force of the second spring 74 in a direction away from the drive gear 46 whereby the outer peripheral teeth 70*a* are separated from the locking teeth 68 of the drive gear 46.

As shown in FIG. 5, the waiting mechanism 116 is provided with two flanged tubular members 118*a*, 118*b*, a tubular-shaped spacer 120 that is interposed between the two flanged tubular members 118*a*, 118*b*, the above-described spring member 114 and a gripping member 122. The two flanged tubular members 118*a*, 118*b* are disposed on the third axis C3 so as to extend along the third axis C3, such that flange portions of the respective tubular members 118*a*, 118*b* are opposed to each other, and such that the fork shaft 102 is slidable in the tubular members 118*a*, 118*b*. The spring member 114 is pre-loaded and disposed radially outside the tubular-shaped spacer 120. The gripping member 122 grips the two flanged tubular members 118*a*, 118*b* such that the tubular members 118*a*, 118*b* are movable along the third axis C3. The gripping member 122 is brought into contact with the flange portions of the flanged tubular members 118*a*, 118*b* whereby the flanged tubular members 118*a*, 118*b* are slid on the fork shaft 102. A distance between the flange portions of the flanged tubular members 118*a*, 118*b* in a state in which the tubular members 118*a*, 118*b* are in contact with the gripping member 122, is larger than an axial length of the tubular-shaped spacer 120. Therefore, the state in which the tubular members 118*a*, 118*b* are in contact with the gripping member 122, is established by a biasing force of the spring member 114. The waiting mechanism 116 is provided with stoppers 124*a*, 124*b* which are provided on an outer circumferential surface of the fork shaft 102, and which limits movements of the tubular members 118a, 118b away from each other in directions parallel to the third axis C3. Owing to the arrangement in which the movements of the tubular members 118a, 118b away from each other are limited by the stoppers 124a, 124b, a force of linear movement of the cam engaging member 103 (that is integrally connected to the gripping member 122) in the direction of the first axis C1 or third axis C3, can be transmitted through the fork shaft 102 to the high-low switching mechanism 48 and the 4WD locking mechanism 58.

In the waiting mechanism 116 constructed as described above, the distance between the flange portions of the flanged tubular members 118a, 118b can be changed between a maximum value and a minimum value, while the high-low switching mechanism 48 establishes the high-speed gear stage H in which the outer peripheral teeth 62b of the high-low sleeve 62 mesh with the high-side gear teeth 64. The above-described maximum value corresponds to the distance between the flange portions of the flanged tubular members 118a, 118b when the flange portions are in contact with the gripping member 122, and the above-described minimum value corresponds to the axial length of the tubular-shaped spacer 120. Thus, the waiting mechanism 116 allows the movement of the nut member 92 of the screw mechanism 86 along the first axis C1 in the direction of arrow F4, between a piston contact position and a piston pressing position, while the fork shaft 102 is held in the high-speed-gear-stage establishing position. When the nut member 92 is positioned in the piston contact position, the piston 82 of the first transmitting mechanism 88a is in contact with the friction engagement element 80 of the front-wheel drive clutch 50. When the nut member 92 is positioned in the piston pressing position, the piston 82 of the first transmitting mechanism 88a is pressed against the friction engagement element 80 of the front-wheel drive clutch 50.

Referring back to FIG. 1, the vehicle 10 is provided with an electronic control unit (ECU) 200 that includes a control apparatus of the vehicle 10 that switches between 2WD state and 4WD state, for example. The ECU 200 includes a so-called microcomputer that has CPU, RAM, ROM, and an input/output interface and the like. The CPU executes various controls of the vehicle 10 by processing signals according to programs pre-stored in the ROM, while using temporary storage function of the RAM. For example, the ECU 200 executes output control that controls the output of the engine 12, and switching control to switch the driving state of the vehicle 10, and the like, and is constructed to be divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L, 14R and the rear wheels 16L, 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a 4WD lock selector switch 214 has been operated, and the like. The various sensors include an engine speed sensor 202, a motor rotation angle sensor 204, wheel speed sensors 206, an accelerator operation amount sensor 208, the H-range selector switch 210 for selecting the high-speed gear stage H in response to an operation by the driver, the 4WD selector switch 212 for selecting 4WD state in response to an operation by the driver, and the 4WD lock selector switch 214 for selecting 4WD locking state in response to an operation by the driver. An engine output control command signal Se for output control of the engine 12, an operation command signal Sd for switching the state of the front-side clutch 36, and a motor drive command signal Sm for controlling the rotation amount of the motor 84 and the like are outputted from the ECU 200 to an output control apparatus of the engine 12, an actuator of the front-side clutch 36, the motor 84, the transfer 22, and the like, as shown in FIG. 1.

In the vehicle 10 constructed as described above, the movement amount (stroke) of the nut member 92 and the rotation amount of the drum cam 100 are controlled by controlling the rotation amount of the electric motor 84. When the drum cam 100 is positioned in the H2 rotational position by rotation of the electric motor 84, the 2WD running mode (in which only the rear wheels 16 are driven) is established in the high-speed gear stage H. When the front-side clutch 36 is placed in the released state with the drum cam 100 being positioned in the H2 rotational position, rotational motion is not transmitted from the engine 12 and the front wheels 14, to rotary elements (such as the above-described drive gear 46, front-wheel drive chain 56, driven gear 54, front-wheel side output shaft 52, front propeller shaft 24 and front-wheel differential gear unit 28) constituting a power transmitting path from the drive gear 46 to the front-wheel differential gear unit 28, during running of the vehicle 10 with the 2WD running mode. Thus, during the 2WD running, the rotations of these rotary elements are stopped so that dragged rotations of the rotary elements are prevented whereby running resistance is reduced.

FIG. 9 shows a state in which the piston 82 of the first transmitting mechanism 88a is in contact with the friction engagement element 80 of the front-wheel drive clutch 50, with the drum cam 100 being positioned in the H4 rotational position. With the nut member 92 being moved toward the pressing side, by controlling the rotation amount of the electric motor 84, from the state shown in FIG. 9, the 4WD running mode is established whereby the power is transmitted toward the front wheels 14 and the rear wheels 16 during the high-speed gear stage H. While the drum cam 100 is being positioned in the H4 rotational position, the transmission torque of the front-wheel drive clutch 50 is controlled depending on the pressing force of the piston 82 whereby torque distribution between the front wheels 14 and the rear wheels 16 is adjusted as needed.

When the drum cam 100 is positioned in L4 rotational position, the front-wheel drive clutch 50 is in the released state and the 4WD locking mechanism 58 is in the engaged state, so that the vehicle 10 is placed in the 4WD running mode with the 4WD lock state in the low-speed gear stage L.

Figure 10:
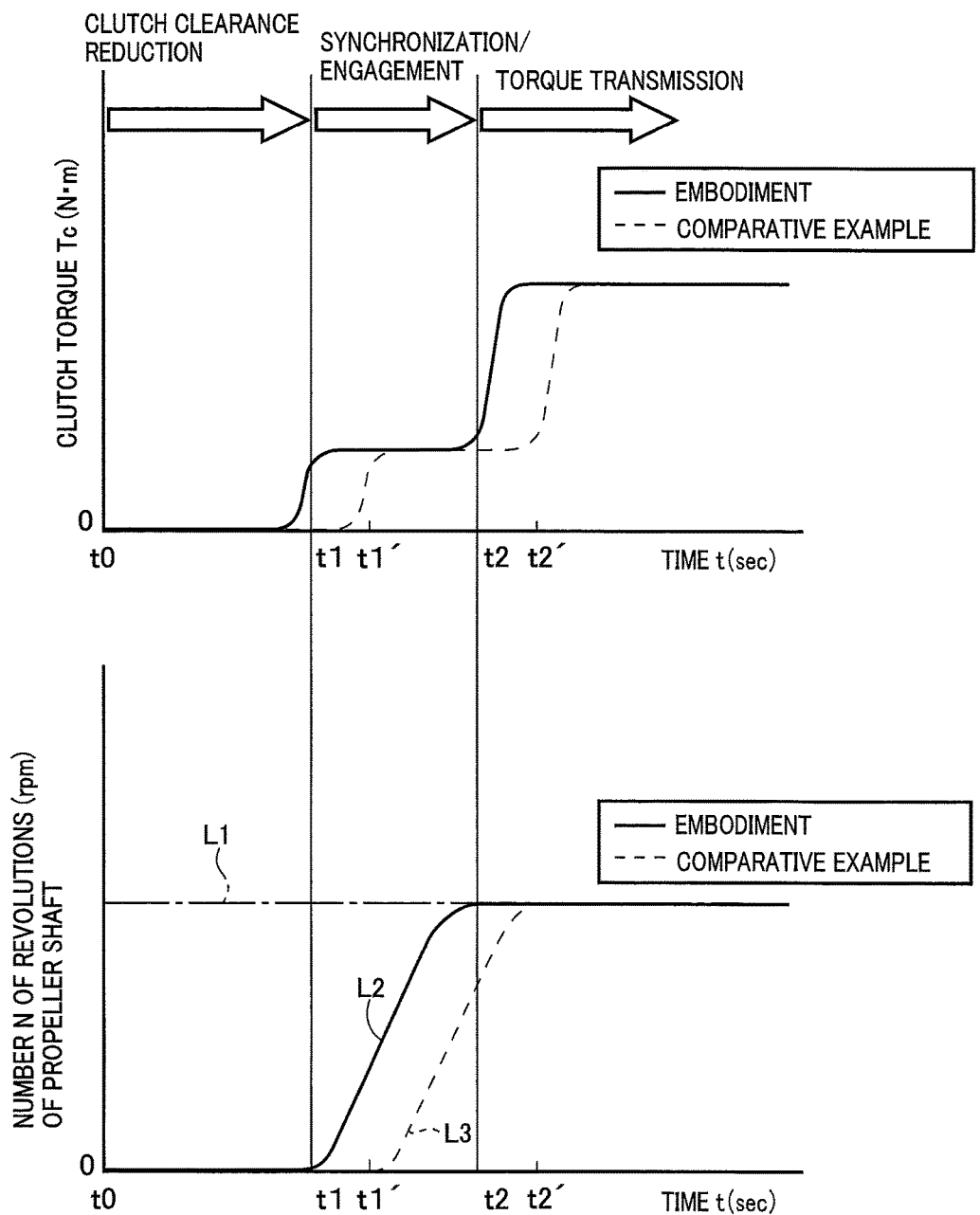
FIG. 10 is a view for comparing the transfer of the embodiment of the invention and a transfer of a comparative example, in terms of (i) a time from initiation of switching from the H2 rotational position to the H4 rotational position, to elimination of a clearance in the front-wheel drive clutch, and (ii) a time from the switching initiation to synchronization/engagement of the front-wheel drive clutch.

FIG. 10 is a view for comparing the transfer 22 of the above-described embodiment and a transfer of a comparative example, in terms of (i) a time t1, t1' from initiation (t=0) of switching from the H2 rotational position to the H4 rotational position, to elimination of the clearance E in the front-wheel drive clutch 50, (ii) a time t2, t2' from the switching initiation (t=0) to synchronization/engagement of the front-wheel drive clutch 50. The transfer of the comparative example is almost the same as the transfer 22 of the embodiment, but is different from the transfer 22 of the embodiment in that the cam groove 100c of the drum cam 100 does not include the second inclined section 100e and extends from the connecting section 100h in the direction of arrow F1 simply in the circumferential direction of the drum cam 100. That is, the transfer of the comparative example is different from the transfer 22 of the embodiment in that, upon switching from the H2 rotational position to the H4 rotational position, the piston 82 is brought into contact with the friction engagement element 80 of the front-wheel drive clutch 50, by movement of the nut member 92 in the direction of arrow F4 (owing to the thread effect exhibited by its cooperation with the screw shaft member 94) which is caused by rotation of the nut member 92 in the direction of arrow F3 by the electric motor 84.

In the transfer 22 of the embodiment, when the nut member 92 and the drum cam 100 are rotated in the direction of arrow F3 about the first axis C1, the drum cam 100 is moved relative to the cam engaging member 103 that is engaged in the second inclined section 100e of the cam groove 100c formed in the drum cam 100, so that the drum cam 100 is moved in the direction of arrow F4 by a distance D2 that is larger than a distance by which the nut member 92 is moved relative to the screw shaft member 94 in the direction of arrow F4 owing to the thread effect exhibited by its cooperation with the screw shaft member 94. Therefore, as shown in FIG. 10, the time t1 (sec) from the initiation of switching from the H2 rotational position to the H4 rotational position, to the elimination of the clearance E in the front-wheel drive clutch 50, namely, the time t1 (sec) from the switching initiation to contact of the piston 82 of the first transmitting mechanism 88a with the friction engagement element 80 of the front-wheel drive clutch 50 is shorter than the corresponding time t1' (sec) in the comparative example. Thus, in the transfer 22 of the embodiment, the time t2 (sec) from the initiation of switching from the H2 rotational position to the H4 rotational position, to synchronization/ engagement of the front-wheel drive clutch 50 is shorter than the corresponding time t2' (sec) in the comparative example, so that the switching from the 2WD running mode to the 4WD running mode during the high-speed gear stage can be completed more quickly than in the transfer of the comparative example. In FIG. 10, one-dot chain line L1 represents the number of revolutions (rpm) of the rear propeller shaft 26 in the transfer 22 of the embodiment and the transfer of the comparative example, solid line L2 represents the number of revolutions (rpm) of the front propeller shaft 24 in the transfer 22 of the embodiment, and broken line L3 represents the number of revolutions (rpm) of the front propeller shaft 24 in the transfer of the comparative example.

As described above, in the present embodiment, the transfer 22 includes: the electric motor 84; the screw mechanism 86 which is supported by the rear-wheel side output shaft 44, and which includes the screw shaft member 94 and the nut member 92 that are in thread engagement with each other, such that the nut member 92 is moved along the first axis C1 when the nut member 92 as one of the screw shaft member 94 and the nut member 92 is rotated by the electric motor 84; the first transmitting mechanism 88a configured to transmit movement of the nut member 92 to the front-wheel drive clutch 50; the fork shaft 102 disposed on the third axis C3 that is parallel to the first axis C1 and axially movable along the third axis C3; the drum cam 100 which is connected to the nut member 92, and which is rotatable about the first axis C1, the drum cam 100 having the cam groove 100c provided in the outer circumferential surface thereof; the second transmitting mechanism 88b including the cam engaging member 103 that is engaged in the cam groove 100c of the drum cam 100, and configured to cause the fork shaft 102 to be moved along the third axis C3 through the cam engaging member 103 when the drum cam 100 is rotated about the first axis C1; the fork 104 provided in the fork shaft 102 and configured to transmit movement of the fork shaft 102 along the third axis C3, to the high-low switching mechanism 48; and the locking member 110 which is configured, when the fork shaft 102 is positioned in the high-speed-gear-stage establishing position that causes the high-low switching mechanism 48 to establish the high-speed gear stage H, to be removably engaged in the recessed portion 102a provided in the fork shaft 102 for restricting the movement of the fork shaft 102 from the high-speed-gear-stage establishing position along the third axis C3, wherein the cam groove 100c of the drum cam 100 includes: the first inclined section 100d and the second inclined section 100e. The first inclined section 100d is configured, when the drum cam 100 is rotated about the first axis C1 with the cam engaging member 103 being engaged within the first inclined section 100d, to cause the fork shaft 102 to be moved along the third axis C3 whereby the high-low switching mechanism 48 is switched between the high-speed gear stage H and the low-speed gear stage L by the movement of the fork shaft 102, which is transmitted to the high-low switching mechanism 48 through the fork 104. The second inclined section 100e is configured, when the drum cam 100 is rotated about the first axis C1 with the cam engaging member 103 being engaged within the second inclined section 100e, to cause the first transmitting mechanism 88a to be switched between (i) a separated position in which the first transmitting mechanism 88a is separated from the front-wheel drive clutch 50 and (ii) a contact position in which the first transmitting mechanism 88a is in contact with the front-wheel drive clutch 50, while the high-speed gear stage H is established in the high-low switching mechanism 48, such that the nut member 92 of the screw mechanism 86 is moved, by rotation of the electric motor 84, along the first axis C1, whereby the first transmitting mechanism 88a is brought into contact with the front-wheel drive clutch 50, while the folk shaft 102 is in the high-speed-gear-stage establishing position. In the transfer 22 constructed as described above, when the nut member 92 is rotated by the electric motor 84, the nut member 92 is moved along the first axis C1 whereby the movement of the nut member 92 is transmitted to the front-wheel drive clutch 50 through the first transmitting mechanism 88a. Further, when the nut member 92 is rotated by the electric motor 84, the fork shaft 102 is moved along the third axis C3 through the cam engaging member 103 of the second transmitting mechanism 88b engaged in the first inclined section 100d of the cam groove 100c, in response to rotation of the drum cam 100 (that is provided in the nut member 92) about the first axis C1, and the movement of the fork shaft 102 is transmitted to the high-low switching mechanism 48 through the fork 104. Thus, the drum cam 100 serving for operation of switching the high-low switching mechanism 48 is provided in the nut member 92, so that the fork shaft is not required to be provided with the drum cam unlike in the prior art, whereby the distance between the rear-wheel side output shaft 44 and the fork shaft 102 can be made small and accordingly the transfer 22 can be made compact in size. Further, the linear motion of the nut member 92 of the screw mechanism 86 disposed on the rear-wheel side output shaft 44 is transmitted to the front-wheel drive clutch 50 through the first transmitting mechanism 88a, so that a ball cam and a lever serving for adjusting a transmission torque of the clutch are not required, unlike in the prior art, whereby distance between the rear-wheel side output shaft 44 and the fork shaft 102 can be made advantageously small and accordingly the transfer 22 can be made compact in size. Moreover, since the first transmitting mechanism 88a is switched between the separated position and the contact position by the second inclined section 100e of the cam groove 100c in response to rotation of the drum cam 100 about the first axis C1, the switching response can be improved over, for example, an arrangement in which the first transmitting mechanism 88a is switched between the separated position and the contact position by movement of the nut member 92 of the screw mechanism 86 along the first axis C1.

Further, in the present embodiment, the locking ball 110 is forced toward the fork shaft 102 by the locking spring 112, such that the locking ball 110 is removed from the recessed portion 102a of the fork shaft 102 when the high-low switching mechanism 48 is switched from the high-speed gear stage H to the low-speed gear stage L by the first inclined section 100d of the cam groove 100c, and such that the locking ball 110 is engaged in the recessed portion 102a of the fork shaft 102 when the first transmitting mechanism 88a is switched from the separated position to the contact position by the second inclined section 100e of the cam groove 100c. When the high-low switching mechanism 48 is to be switched from the high-speed gear stage H to the low-speed gear stage L, the locking ball 110 is removed from the recessed portion 102e of the fork shaft 102 against the biasing force of the locking spring 112, whereby the fork shaft 102 is allowed to be moved along the third axis C3 and accordingly the high-speed gear stage H is switched to the low-speed gear stage L. When the first transmitting mechanism 88a is to be switched from the separated position to the contact position, the locking ball 110 is held engaged in the recessed portion 102a of the fork shaft 102 thereby restricting movement of the fork shaft 102 along the third axis C3, so that the separated position is switched to the contact position whereby first transmitting mechanism 88a is brought into contact with the front-wheel drive clutch 50 while the high-speed gear stage H is established.

Further, in the present embodiment, the rear-wheel side output shaft 44 is rotatably held, at one of axially opposite end portions thereof which is located on a side of the drum cam 100, by the second support bearing 73 which is located radially inside the drum cam 100 within an axial length of the drum cam 100. This arrangement makes it possible to advantageously reduce an axial length of the transfer 22 as measured in parallel to the first axis C1.

Further, in the present embodiment, the first inclined section 100d of the cam groove 100c extends in a direction inclined with respect to a circumferential direction of the drum cam 100. The cam engaging member 103 is moved in the direction of the third axis C3 by a distance larger than a distance by which the nut member 92 is moved relative to the screw shaft member 94 in the direction of the first axis C1, when the drum cam 100 and the nut member 92 are rotated about the first axis C1 by the electric motor 84, during engagement of the cam engaging member 103 within the first inclined section 100d of the cam groove 100c. Owing to this arrangement, the switching between the high-speed gear stage H and the low-speed gear stage L in the high-low switching mechanism 48 can be made with a remarkably higher response than an arrangement in which the switching between the high-speed gear stage H and the low-speed gear stage L is made by movement of the nut member 92 along the first axis C1 in the screw mechanism 86.

Further, in the present embodiment, the nut member 92 is in thread engagement with the screw shaft member 94 through the plurality of balls 96. Owing to this arrangement, the nut member 92 and the screw shaft member 94 are smoothly rotatable relative to each other, thereby making it possible to stably reduce an electric power required for operation of the electric motor 84.

Further, in the present embodiment, the second transmitting mechanism 88b includes the waiting mechanism 116 that is configured to transmit movement of the cam engaging member 103 in the direction of the first axis C1, to the fork shaft 102 through the spring member 114. Therefore, upon switching between the high-speed gear stage H and the low-speed gear stage L in the high-low switching mechanism 48, a shock caused in the switching can be absorbed by the spring member 114 of the waiting mechanism 116.

While the embodiment of the present invention has been described above in detail by reference to the accompanying drawings, it is to be understood that the present invention may be embodied otherwise.

In the above-described embodiment, the nut member 92 of the screw mechanism 86 is moved along the first axis C1 by rotation of the nut member 92 by the electric motor 84. However, the screw mechanism 86 may be modified such that the movement of the nut member 92 along the first axis C1 is made by rotation of the screw shaft member 94 by the electric motor 84, for example. In this modified arrangement in which the screw shaft member 94 is rotated by the electric motor 84, the nut member 92 is supported by, for example, the transfers case 40 so as to be movable along the first axis C1 and unrotatable about the first axis C1 while the screw shaft member 94 is supported by the rear-wheel side output shaft 44 so as to be rotatable about the first axis C1. Further, the drum cam 100 is connected to the screw shaft member 94 rather than to the nut member 92. In the modified arrangement, when the screw shaft member 94 is rotated by the electric motor 84, the nut member 92 is moved along the first axis C1 and the linear motion of the nut member 92 is transmitted to the front-wheel drive clutch 50 through the first transmitting mechanism 88a. Further, when the screw shaft member 94 is rotated by the electric motor 84, the drum cam 100 connected to the screw shaft member 94 is rotated whereby the cam engaging member 103 engaged in the cam groove 100c is moved in the direction of the third axis C3, and the linear motion of the cam engaging member 103 is transmitted to the high-low switching mechanism 48 and the 4WD locking mechanism 58. When the drum cam 100 is rotated from the H2 rotational position to the H4 rotational position, the screw shaft member 94 connected to the drum cam 100 is moved in the direction of arrow F4, namely, the screw mechanism 86 and the first transmitting mechanism 88a are moved in the direction of arrow F4, whereby the clearance E in the front-wheel drive clutch 50 is eliminated.

In the above-described embodiment, the screw mechanism 86 is constituted by the ball screw by way of example. However, the screw mechanism 86 may be, for example, a simple mechanism in which the screw shaft member 94 and the nut member 92 are in thread engagement with each other directly without a plurality of balls interposed therebetween, as long as the screw mechanism 86 serves as a mechanism configured to convert a rotational motion of the electric motor 84 into a linear motion. Specifically, the screw mechanism 86 may be a slide screw or the like. Where the screw mechanism 86 is a slide screw, a mechanical efficiency at which rotational motion is converted into linear motion is lower than where it is a ball screw, but it is possible to obtain certain effects such as application of high thrust to the front-wheel drive clutch 50 and generation of stroke required for operation of the high-low switching mechanism 48.

In the above-described embodiment, the screw mechanism 86 is connected to the electric motor 84 indirectly via the worm gear 90. However, the screw shaft member 94 or the nut member 92 of the screw mechanism 86 may be connected to the electric motor 84 directly without via the worm gear 90, for example. Specifically, the nut member 92 and the electric motor 84 may be connected directly to each other such that gear teeth formed on the nut member 92 mesh with a pinion provided on the motor shaft of the electric motor 84.

In the above-described embodiment, an FR-based four-wheel-drive vehicle is given as an example of the vehicle 10 in which the transfer 22 is employed. However, the vehicle 10 in which the transfer 22 is to be employed may also be a front-engine/front-wheel-drive (FF) based four-wheel-drive vehicle, for example. Further, while the front-wheel drive clutch 50 is a multi-plate clutch in the above-described embodiment, the clutch 50 may also be a single-plate clutch.

In the above-described embodiment, an internal combustion engine such as a gasoline engine or a diesel engine may be used as the engine 12 that has been described as the driving force source by way of example. Further, the driving force source may be constituted by another prime mover such as an electric motor, for example, may be used either alone or in combination with the engine 12. Further, the transmission 20 may be any one of various types of automatic transmissions such as a planetary gear type stepped transmission, a continuously variable transmission (CVT), a synchronous mesh twin shaft parallel axis-type transmission (including known DCT) and a known manual transmission. Moreover, while the front-side clutch 36 is an electromagnetic dog clutch in the above-described embodiment, the clutch 36 may also be a type of friction clutch or a dog clutch that is provided with a shift fork configured to move a sleeve in its axial direction, wherein the shift fork is driven by an electrically controllable or hydraulically controllable actuator, or the like.

While the embodiment of the present invention has been described above for illustrative purpose only, it is to be understood that the present invention may be embodied with various changes and improvements, which may occur to those skilled in the art.

What is claimed is:

1. A transfer for a vehicle, said transfer comprising:
    an input shaft and an output shaft disposed on a common axis and coaxial with each other;
    a high-low switching mechanism configured to change a speed of rotation inputted to said input shaft, by selectively establishing a high-speed gear stage and a low-speed gear stage, and to transmit the rotation to said output shaft;
    an output member whose output destination is different from output destination of said output shaft;
    a clutch configured to adjust a part of a power transmitted to said output shaft, and to transmit the adjusted part of the power to said output member;
    an electric motor;
    a screw mechanism which is supported by said output shaft, and which includes an externally threaded member and an internally threaded member that are in thread engagement with each other, such that a rotatable threaded member that is one of said externally threaded member and said internally threaded member is rotatable by said electric motor, and such that said internally threaded member is moved along the common axis when said rotatable threaded member is rotated by said electric motor;
    a first transmitting mechanism configured to transmit movement of said internally threaded member to said clutch;
    a fork shaft disposed on a parallel axis that is parallel to the common axis and axially movable along the parallel axis;
    a drum cam which is connected to said rotatable threaded member, and which is rotatable about the common axis, said drum cam having a cam groove provided in an outer circumferential surface thereof;
    a second transmitting mechanism including a cam engaging member that is engaged in said cam groove of said drum cam, and configured to cause said fork shaft to be axially moved along the parallel axis through said cam engaging member when said drum cam is rotated about the common axis;
    a fork provided in said fork shaft and configured to transmit axial movement of said fork shaft along the parallel axis, to said high-low switching mechanism; and
    a locking member which is configured, when said fork shaft is positioned in a high-speed-gear-stage establishing position that causes said high-low switching mechanism to establish the high-speed gear stage, to be removably engaged in a recessed portion provided in said fork shaft for restricting the axial movement of said fork shaft from the high-speed-gear-stage establishing position along the parallel axis,
    wherein said cam groove of said drum cam includes:
    a first inclined section configured, when said drum cam is rotated about the common axis with said cam engaging member being engaged within said first inclined section, to cause said fork shaft to be moved along the parallel axis whereby said high-low switching mechanism is switched between the high-speed gear stage and the low-speed gear stage by the axial movement of said fork shaft, which is transmitted to said high-low switching mechanism through said fork; and
    a second inclined section configured, when said drum cam is rotated about the common axis with said cam engaging member being engaged within said second inclined section, to cause said first transmitting mechanism to be switched between (i) a separated position in which said first transmitting mechanism is separated from said clutch and (ii) a contact position in which said first transmitting mechanism is in contact with said clutch, while the high-speed gear stage is established in said high-low switching mechanism, such that said screw mechanism is moved, by rotation of said electric motor, along said common axis, whereby said first transmitting mechanism is separated from or is brought into contact with said clutch while said folk shaft is in the high-speed-gear-stage establishing position.

2. The transfer according to claim 1, wherein said locking member is forced toward said fork shaft by a locking spring, such that said locking member is removed from said recessed portion of said fork shaft when said high-low switching mechanism is switched from the high-speed gear stage to the low-speed gear stage by said first inclined section of said cam groove, and such that said locking member is engaged in said recessed portion of said fork shaft when said first transmitting mechanism is switched from the separated position to the contact position by said second inclined section of said cam groove.

3. The transfer according to claim 1, wherein said output shaft is rotatably held, at one of axially opposite end portions thereof which is located on a side of said drum cam, by an output-shaft supporting bearing which is located radially inside said drum cam within an axial length of said drum cam.

4. The transfer according to claim 1,
wherein said drum cam as well as said rotatable threaded member is rotatable by said electric motor,
wherein said first inclined section of said cam groove extends in a direction inclined with respect to a circumferential direction of said drum cam, and
wherein said cam engaging member is moved along the parallel axis by a distance larger than a distance by which said internally threaded member is moved relative to said externally threaded member along the common axis, when said drum cam and said rotatable threaded member are rotated about the common axis by said electric motor, during engagement of said cam engaging member within said first inclined section of said cam groove.

5. The transfer according to claim 1, wherein said internally threaded member is in thread engagement with said externally threaded member through a plurality of balls.

6. The transfer according to claim 1, wherein said second transmitting mechanism includes a waiting mechanism that is configured to transmit movement of said cam engaging member along the common axis, to said fork shaft through a spring member.

7. The transfer according to claim 1,
wherein said externally threaded member and said internally threaded member of said screw mechanism are movable along the common axis relative to said output shaft that holds said screw mechanism, and
wherein the other of said externally threaded member and said internally threaded member is an unrotatable threaded member that is held by a non-rotating member of said transfer and is unrotatable relative to said non-rotating member.

8. The transfer according to claim 1,
wherein said clutch includes a pressing-force receiving portion such that said clutch is placed in slipping state or engaged state when said pressing-force receiving portion receives a pressing force which is based on the movement of said internally threaded member and which is applied through a pressing portion of said first transmitting mechanism,
wherein said cam groove provided in said outer circumferential surface of said drum cam further includes a circumferentially central section which extends in a circumferential direction of said drum cam and which is located between said first inclined section and said second inclined section of said cam groove in said circumferential direction,
wherein said first inclined section of said cam groove extends from one of circumferentially opposite ends of said circumferentially central section, in a direction inclined with respect to said circumferentially central section extending in said circumferential direction, said first inclined section having a circumferentially distal end that is distant from said circumferentially central section by a first distance in an axial direction of said drum cam,
wherein said second inclined section of said cam groove extends from the other of circumferentially opposite ends of said circumferentially central section, in a direction inclined with respect to said circumferentially central section extending in said circumferential direction, said second inclined section having a circumferentially distal end that is distant from said circumferentially central section in said axial direction by a second distance smaller than said first distance,
wherein, when said cam engaging member is in said circumferentially central section, said folk shaft is in the high-speed-gear-stage establishing position with said locking member being engaged in said recessed portion by a biasing force of a locking spring,
wherein, during movement of said cam engaging member within said second inclined section, relative to said cam groove in a direction away from said circumferentially central section, by rotation of said drum cam in a second rotating direction, said drum cam is axially moved, as a result of restriction of the axial movement of said fork shaft by said locking member, in a pressing-force generating direction that causes said internally threaded member to be moved to generate said pressing force applied to said pressing-force receiving portion of said clutch, and
wherein, during movement of said cam engaging member within said first inclined section, relative to said cam groove in a direction away from said circumferentially central section, by rotation of said drum cam in a first rotating direction that is opposite to said second rotating direction, said drum cam is axially moved, as a result of restriction of the axial movement of said fork shaft by said locking member, in said pressing-force generating direction, and then said locking member is removed, against said biasing force of said locking spring, from said recessed portion owing to a reaction force acing against said pressing force, before said cam engaging member reaches said circumferentially distal end of said first inclined section whereby said folk shaft is moved to a low-speed-gear-stage establishing position that causes said high-low switching mechanism to establish the low-speed gear stage.

9. The transfer according to claim 8,
wherein, when said drum cam is axially moved during movement of said cam engaging member, relative to said cam groove, within said second inclined section, by rotation of said drum cam in said second rotating direction, said internally threaded member is axially moved relative to said externally threaded member in a direction as the same as said pressing-force generating direction in which said drum cam is axially moved relative to said cam groove, and
wherein, when said drum cam is axially moved during movement of said cam engaging member, relative to said cam groove, within said first inclined section, by rotation of said drum cam in said first rotating direction, said internally threaded member is axially moved relative to said externally threaded member in a direction that is opposite to said pressing-force generating direction.

10. The transfer according to claim 9,
wherein said cam groove further includes a second non-inclined section extending in a direction parallel to said circumferentially central section, from said circumferentially distal end of said second inclined section that is located between said second non-inclined section and said circumferentially central section in said circumferential direction, and
wherein, during movement of said cam engaging member, relative to said cam groove, within said second non-inclined section, by rotation of said drum cam in said second rotating direction, said internally threaded member is axially moved relative to said externally threaded member in said direction as the same as said pressing-force generating direction, without said drum cam being axially moved in said pressing-force generating direction.

11. The transfer according to claim 1,
wherein said high-low switching mechanism includes a differential mechanism having at least a first rotary element and a second rotary element that are to be rotated by rotation of said input shaft, such that said second rotary element is to be rotated by a speed lower than a speed of rotation of said first rotary element,
wherein said high-low switching mechanism further includes a high low sleeve mounted on said output shaft, such that said high low sleeve is unrotatable relative to said output shaft, and is movable relative to said output shaft along the common axis by movement of said fork shaft through said fork, so as to be selectively positioned in a high-speed rotation transmitting position and a low-speed rotation transmitting position that are distant from each other in a direction parallel to the common axis,
wherein said high-low switching mechanism is configured, when said high low sleeve is positioned in the high-speed rotation transmitting position, to transmit rotation of said first rotary element to said output shaft, thereby establishing the high-speed gear stage,
wherein said high-low switching mechanism is configured, when said high low sleeve is positioned in the low-speed rotation transmitting position, to transmit rotation of said second rotary element to said output shaft, thereby establishing the low-speed gear stage, and
wherein said high low sleeve is positioned in the high-speed rotation transmitting position when said fork shaft is positioned in the high-speed-gear-stage establishing position, and is positioned in the low-speed rotation transmitting position when said fork shaft is positioned in a low-speed-gear-stage establishing position that is distant from the high-speed-gear-stage establishing position in a direction parallel to the parallel axis.

* * * * *